United States Patent [19]
Urano et al.

[11] Patent Number: 6,075,556
[45] Date of Patent: Jun. 13, 2000

[54] THREE-DIMENSIONAL IMAGE CODING BY MERGER OF LEFT AND RIGHT IMAGES

[75] Inventors: Takashi Urano, Matsudo; Hideo Kodama, Warabi; Yasuhachi Hamamoto, Kawaguchi; Etsuko Sugimoto, Tokyo; Satoko Kobayashi, Yokosuka, all of Japan

[73] Assignee: Sanyo Electric Co., Ltd., Moriguchi, Japan

[21] Appl. No.: 09/048,312

[22] Filed: Mar. 26, 1998

Related U.S. Application Data

[62] Division of application No. 08/492,908, Jun. 20, 1995, Pat. No. 5,767,898.

[30] Foreign Application Priority Data

Jun. 23, 1994 [JP] Japan .................................. 6-142020

[51] Int. Cl.[7] .............................. H04N 7/32; H04N 13/00
[52] U.S. Cl. .............................................. 348/43; 348/415
[58] Field of Search .................................. 348/42, 43, 46, 348/47, 384, 390, 400, 401, 402, 409, 415, 416

[56] References Cited

U.S. PATENT DOCUMENTS

| | | | |
|---|---|---|---|
| 4,562,463 | 12/1985 | Lipton ........................................ | 348/56 |
| 4,734,756 | 3/1988 | Butterfield et al. ........................ | 348/53 |
| 4,736,246 | 4/1988 | Nishikawa ................................ | 348/56 |
| 5,227,878 | 7/1993 | Puri et al. ................................. | 348/416 |
| 5,231,484 | 7/1993 | Gonzales et al. ......................... | 348/405 |
| 5,293,229 | 3/1994 | Iu ............................................. | 348/415 |
| 5,325,125 | 6/1994 | Naimpally et al. ....................... | 348/402 |
| 5,347,309 | 9/1994 | Takahashi ................................. | 348/401 |
| 5,453,799 | 9/1995 | Yang et al. ............................... | 348/402 |
| 5,526,039 | 6/1996 | Hutchinson .............................. | 348/46 |
| 5,596,321 | 1/1997 | Hekstra et al. ........................... | 348/409 |

FOREIGN PATENT DOCUMENTS

| | | |
|---|---|---|
| 63-265886 | 11/1987 | Japan . |
| 63-116591 | 5/1988 | Japan . |
| 63-116592 | 5/1988 | Japan . |
| 3-40687 | 2/1991 | Japan . |
| 3-65943 | 3/1991 | Japan . |
| 4-40193 | 2/1992 | Japan . |
| 4-79484 | 3/1992 | Japan . |
| 4-145777 | 5/1992 | Japan . |
| 4-207790 | 7/1992 | Japan . |
| 4-234276 | 8/1992 | Japan . |
| 5-137129 | 6/1993 | Japan . |
| 6-98314 | 4/1994 | Japan . |
| 6-133301 | 5/1994 | Japan . |
| 6-153239 | 5/1994 | Japan . |
| 7-123447 | 5/1995 | Japan . |

OTHER PUBLICATIONS

Nogaki S., A Study of Applying MPEG–2 Video Coding for Stereo Motion Picture, Published Oct. 17, 1994 at 94' Video Coding Symposium, pp. 43–44.

International Standard—Information Technology—Coding of moving pictures and associated audio for digital storage media at up to about 1,5 Mbit/s—First Edition, Aug. 1, 1993, ISO/IEC 11172–2, pp. 78–85.

International Organization for Standardization, ISO/IEC 13818–2, Info. Tech.—Generic Coding of Moving Pictures & Assoc. Audio, Mar. 25, 1994, pp. 22–89.

*Primary Examiner*—Bryan Tung
*Attorney, Agent, or Firm*—Armstrong, Westerman, Hattori, McLeland, & Naughton

[57] ABSTRACT

A method is disclosed, for encoding a signal with a three dimensional image sequence using a series of left and right images. Each image in the left image series is a picture formed by non-interlaced or interlaced scanned left line images, and each image in the right image series is a picture formed by non-interlaced or interlaced scanned right line images. The left line images contained in the left picture are merged with the right line images contained in the right picture to produce an alternately arranged left and right line merged picture. The merged picture is encoded using an MPEG–2 compliant encoder.

4 Claims, 28 Drawing Sheets

Fig. 4
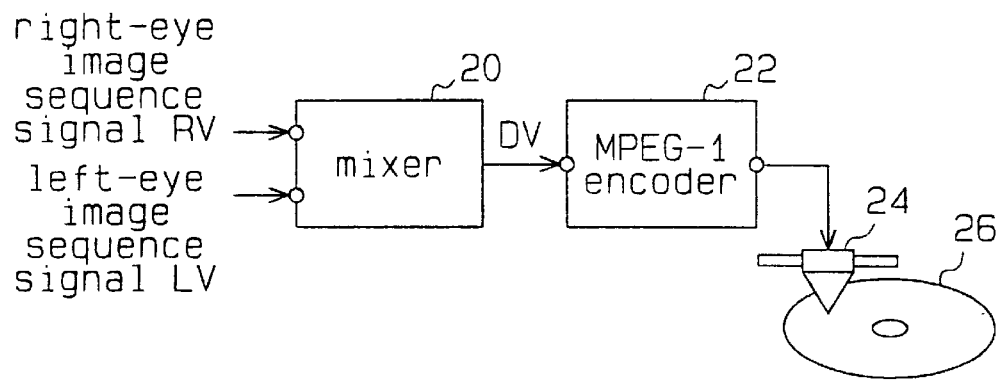
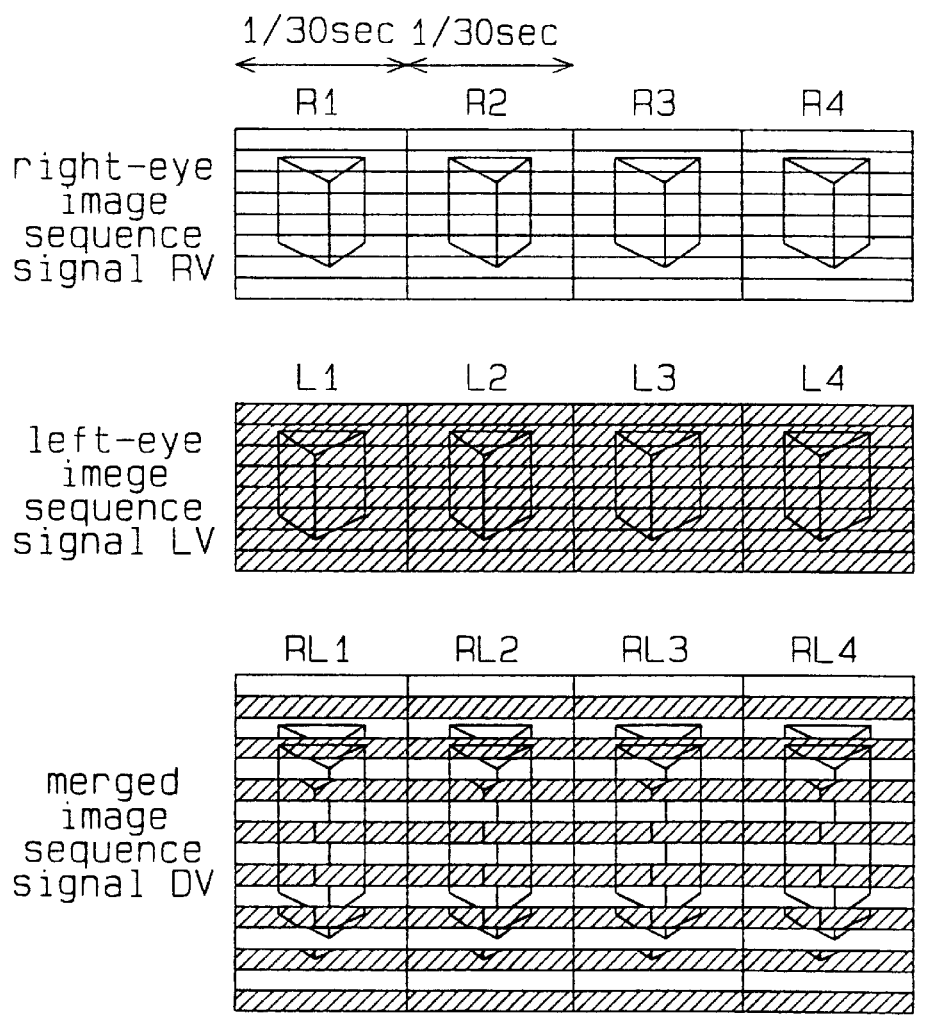
Fig. 5

I-picture   B-picture   P-picture forward prediction motion vector MV (F)

bidirectional prediction motion vector MV (F+B)

backward prediction motion vector MV (B)

MV (Fe)

MV (Fo)

MV (Be)

MV (Bo)

MV (Fe+Be)

MV (Fe+Bo)

MV (Fo+Be)

MV (Fo+Bo)

MVS (Fe)

MVS (Fe+Be)

MVS (Fo)

MVS (Fe+Bo)

MVS (Be)

MVS (Fo+Be)

MVS (Bo)

MVS (Fo+Bo)

THREE-DIMENSIONAL IMAGE CODING BY MERGER OF LEFT AND RIGHT IMAGES

This application is a Division of prior application Ser. No. 08/492,908 filed Jun. 20, 1995 now U.S. Pat. No. 5,767,898.

BACKGROUND OF THE INVENTION

1. Field of the Invention

The present invention relates generally to a method and apparatus for encoding and decoding a three dimensional (3D) image sequence signal, and in particular, to a method and apparatus of encoding and decoding a 3D image sequence signal containing image sequences for left and right eye viewing.

2. Description of the Related Art

There are three common ways to encode a digital 3D image sequence signal containing left and right eye images. The first method directly encodes a main picture, intended for the right eye, and an indirectly encodes a sub-picture, intended for the left eye. The sub-picture image is formed by parallactic compensation or reference to the main picture. The main and sub pictures are then compressed according to the method described in Japanese Unexamined Patent Publication No. 6-153239. The second method directly encodes a main picture and indirectly encodes a first sub picture, using parallax and motion compensation, with reference to the main picture or second sub picture.

With respect to the first or second methods, however, separate processing of the main and sub-pictures, as described above, complicates timing control and picture code management. With either first or second methods, uniform picture quality is difficult to achieve. Neither method presents an efficient way to control the encoding or decoding of 3D left and right eye image sequences. The third method independently encodes a main picture and a sub-picture, in accordance with the MPEG (Moving Picture Image Coding Experts Group) standards. Decoding a 3D image sequence signal, encoded by any of these methods, is a simple matter of reversing the encoding process to obtain a reconstructed 3D image.

At the present, there are two MPEG standards: MPEG-1 and MPEG-2. The International Standards organization (ISO) defines MPEG-1 as the current standard ISO/IEC 11172, and MPEG-2 as a proposed standard ISO/IEC 13818. The two standards differ from each other in data encoding rates. U.S. Pat. No. 5,231,484, U.S. Pat. No. 5,293,229 and U.S. Pat. No. 5,325,125 are examples of technology designed to meet MPEG system standards. Typical MPEG compliant equipment encode signals in bit stream syntax format. This type of format is based on a six-layered structure: a sequence of Groups Of Pictures (GOP), individual GOPs containing a plurality of pictures, a collection of slices within each picture, a plurality of macroblocks within each slice, and a plurality of blocks within each macroblock. MPEG compliant encoders perform motion-compensated predictive encoding, discrete cosine transformation (DCT), adaptive quantization and Huffman coding to produce an I-picture, P-picture, and B-picture. Typical encoding of B-picture operations first collate one frame of data, called the current frame, with a reference frame of data. The reference frame either precedes or follows the current frame in time. The encoder then searches the reference frame for a reference macroblock—a macroblock with data similar to the current macroblock. The encoder then compresses data in the current frame, and determines the difference between the current and reference macroblock. The encoder next obtains vector data indicating the position of the reference macroblock (also called a motion vector) from the position of the current macroblock. Japanese Unexamined Patent Publication Nos. 4-145777, 4-79484, 3-40687, 4-207790, 4-234276 and 4-40193 disclose the technique of obtaining motion vectors. The MPEG standard ISO/IEC 11172 includes various methods for detecting a motion vector. These methods include full searching, logarithmic searching and telescopic searching. To compress the difference data between the current and reference macroblocks, the encoder performs DCT, quantization and variable-length coding. DCT is performed in the units of 8×8 pixels (block), a quarter of the 16×16 pixels in a macroblock. MPEG compliant encoders are capable of expanding the compressed difference data, adding motion vector designated macroblock data to the reference frame, and reconstructing the picture data contained in the current macroblock. During difference data expansion, the encoder performs variable-length decoding, inverse quantization and inverse DCT. The encoder typically accesses its own memory to store picture code of at least one frame preceding and following the current picture frame.

Independent encoding of nondivergent right and left eye picture codes, according to the third method however, is a highly inefficient way to compress code. Enhanced 3D images require a perceptible difference between the right and left eye pictures. Nonetheless, the code used to form both pictures is rarely completely divergent over any extended period of time. Typically, much of the code is shared between the right and left eye pictures. Therefore, to separately encode and decode shared code, as the third method does, is inherently inefficient.

SUMMARY OF THE INVENTION

Accordingly, it is a primary objective of the present invention to provide a method and apparatus to improve the efficiency of compressing and encoding 3D image sequences.

To achieve the foregoing and other objects and in accordance with the purpose of the present invention, an improved method is provided, for encoding a signal with a three dimensional image sequence using a series of left and right images. Each image in the left image series is a left picture formed by non-interlaced or interlaced scanned left line data, and each image in the right image series is a right picture formed by non-interlaced or interlaced right line data.

The method according to the first aspect of the present invention comprises the steps of: merging the left line images contained in the left picture with the right line images contained in the right picture to produce a plurality of merged pictures; and continuously encoding said merged pictures using an MPEG-1 compliant encoder.

The method according to the second aspect of the present invention comprises the steps of: merging the left line images contained in the left picture with the right line images contained in the right picture to produce a plurality of alternately arranged left and right line merged pictures and continuously encoding the merged pictures using an MPEG-2 compliant encoder.

The method according to the third aspect of the present invention is provided, for encoding signal with a three dimensional image sequence using a series of left and right images. Each of the left video images is a left picture contains a first field formed from odd-line numbered interlaced scanned data and a second field formed from even-line numbered interlaced scanned data, and each of the right video images is a right picture contains a third field formed from odd-line numbered interlaced scanned data and a fourth field formed from even-line numbered interlaced scanned data. The method comprises the steps of: (A) merging the images contained in the first and third fields to produce a first merged field of alternatively arranged first and third field odd-numbered line; (B) merging the data contained in the second and fourth fields to produce a second merged field of alternatively arranged second and fourth field even-numbered line; and (C) continuously encoding the first and second merged fields using an MPEG-2 compliant encoder.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

FIGS. 4 through 13 and 14A, 14B and 14C illustrate a first example according to the first embodiment.

FIG. 4 is a block diagram illustrating an encoding apparatus;

FIG. 5 is an explanatory diagram illustrating the merging of right and left image sequences;

FIG. 6 is a detailed block diagram showing a mixer;

FIG. 7 is a timing diagram illustrating how a merged picture is formed by writing and reading right and left image sequences;

FIG. 8 is a block diagram showing an MPEG-1 encoder;

FIG. 9 is an explanatory diagram illustrating the operation of a picture re-order circuit;

FIG. 10 is a diagram showing conversion of a macroblock to blocks;

FIG. 11 is a diagram illustrating procedures of encoding a block;

FIG. 12 is a detailed block diagram showing a motion detector and a mode discriminator;

FIG. 13 is an explanatory diagram illustrating a frame used in predictive encoding; and FIG. 14A is an explanatory diagram illustrating forward prediction, FIG. 14B is an explanatory diagram illustrating bidirectional prediction, and FIG. 14C is an explanatory diagram illustrating backward prediction.

FIG. 16 is a block diagram of an encoding apparatus;

FIG. 17 is a block diagram of a MPEG-2 compliant encoder operating in a frame structure mode;

FIG. 18 is a diagram illustrating the conversion of a macroblock to frame blocks;

FIG. 19 is a diagram illustrating the conversion of a macroblock to field blocks;

FIG. 20 is an explanatory diagram illustrating a frame used in predictive encoding;

FIG. 21 is a detailed block diagram showing a motion detector and a mode discriminator;

FIG. 22 is a diagram explaining inter-frame prediction;

FIG. 23 is a diagram illustrating the separation of a macroblock into two half macroblocks for right and left image sequences;

FIGS. 24A through 24H are explanatory diagrams illustrating field prediction using a right half macroblock; and FIGS. 25A through 25H are diagrams explaining field prediction using a left half macroblock.

FIGS. 26 through 35 illustrate a fourth example according to the first embodiment.

FIG. 26 is a block diagram schematically illustrating an encoding apparatus;

FIG. 27 is a block diagram of a mixer;

FIG. 28 is a diagram explaining the merging of right and left image sequences;

FIG. 29 is a block diagram showing a MPEG-2 compliant encoder operating in a field structure mode;

FIG. 30 is a diagram illustrating a frame used in predictive encoding;

FIG. 31 is a detailed block diagram showing a motion detector and a mode discriminator;

FIG. 35 is a diagram showing conversion of a macroblock to upper and lower macroblocks;

DETAILED DESCRIPTION OF THE PREFERRED EMBODIMENTS

First Embodiment

Figure 1:
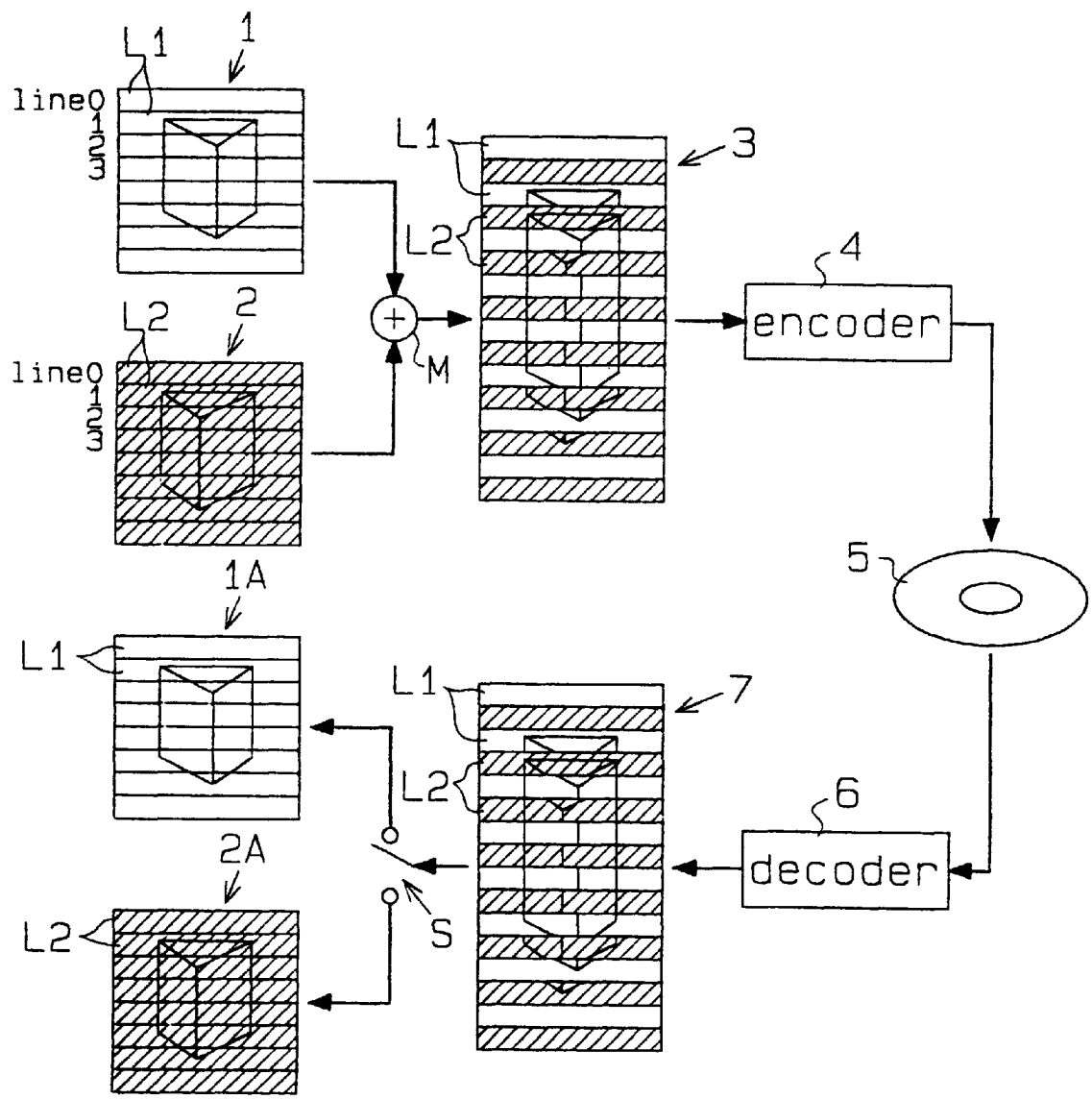
FIG. 1 is a diagram showing the encoding and decoding of a sequence of 3D images according to a first embodiment of the present invention.

A first embodiment of the present invention will now be described with reference to the accompanying drawings. As shown in FIG. 1, left and right video image sequences for the left and right eyes have left and right pictures 1 and 2, respectively. The left picture 1 contains a plurality of non-interlaced or progressive line images obtained by non-interlaced scanning. The right picture 2 also contains a plurality of non-interlaced or progressive line images obtained by non-interlaced scanning. Occasionally, the left picture 1 is called left frame, while the right picture 2 is called right frame. Each of left and right pictures 1 and 2 may be formed by a plurality of interlaced scanned line images. In this case, the left picture 1 is called left field, while the right picture 2 is called right field. A mixer M receives the left picture 1 and the right picture 2 and merges the left picture 1 and the right picture 2. During this process, lines L1 of the left picture 1 and lines L2 of the right picture 2 are merged in alternating sequence to form a merged picture 3. An encoder 4 receives and encodes the merged picture 3 from the mixer M. The encoder 4 conforms to MPEG-1 or MPEG-2 standards, both of which are international standards used for image sequencing, i.e., for motion pictures. The encoder 4 can encode two types of pictures: a picture with a frame structure resembling merged picture 3 or a picture having a field structure consisting of odd and even numbered field pictures. The encoder 4 handles picture data in syntax format. This format utilizes a layered structure based on a block of picture element data (PEL). A group of blocks forms a macroblock, a group of macroblocks forms a slice, a group of slices form a GOP (Group of Pictures), and a plurality of GOPs form an image sequence. A typical macroblock contains six blocks of data: four blocks of luminance signals and two b locks of chrominance signals.

Operations performed by the encoder 4 include discrete cosine transforms (DCT), motion-compensated inter-frame prediction, quantization and Huffman coding. During the DCT operation, the encoder 4 converts the orthogonal coordinates of an 8×8 block of pixels, contained in the luminance and chrominance signals, to reduce the spacial redundancy of picture data. This causes both signals to exhibit increased low spatial frequency components and decreased high spatial frequency components. After the quantization of a signal, the encoder 4 performs Huffman coding. In the motion-compensated inter-frame prediction, the encoder 4 removes the redundant portions of the picture data along the time axis. That is, the encoder 4 detects the difference between a particular series of successive merged picture and encodes the difference. The encoder 4 then detects the direction and magnitude of frame motion, macroblock by macroblock, using a motion vector. Motion vector data is then encoded as motion compensation data. The encoder 4 continues encoding with Huffman and variable-length type coding. An encoded picture frame 3 is output by the encoder 4 to a recording apparatus (not shown) equipped with an optical pickup for recording on a magneto-optical disk 5. The encoder's merging of the left picture 1 and right picture 2 into a single merged picture 3, is based on MPEG standards. The alternate merging of the lines L1 of the left picture 1 and the lines L2 of the right picture 2 improves the efficiency by which encoder 4 encodes data.

To reconstruct the left and right pictures 1,2 respectively, first the optical pickup (not shown) reads encoded data recorded on the magneto-optical disk 5. A decoder 6 receives and records the resultant signal detected by the pickup. Like the encoder 4, the decoder 6 conforms to the MPEG-1 or MPEG-2 standards. The operations performed by decoder 6 during picture reconstruction, however, are the inverse of those performed by the encoder 4: variable-length decoding, inverse quantization and inverse DCT. When the motion compensation is present in inter-frame data, the decoder 6 decodes the motion vector included in the encoded data and reconstructs the motion-compensated picture using the decoded motion vector and a decoding reference picture stored in its own reference memory (not shown). The decoder 6, following MPEG standards, decodes the encoded data to reconstruct the merged picture 7. Merged picture 7 is identical to merged picture 3, and is formed by merging lines L1 and L2 in alternating fashion. The decoder 6 then outputs the reconstructed merged picture 7 to a separator S. The separator S separates the reconstructed merged picture 7 to a reconstructed left picture 1A and a reconstructed right picture 2A. The separator S alternately separates the individual lines L1 and L2 such that the odd-numbered lines L1 form the left picture 1 and the even-numbered lines L2 form the right picture 2. This process of taking an interlaced merged picture 3 allows for decoding the left and right merged pictures 1,2 by the MPEG compliant decoder 6.

Second Embodiment

Figure 2:
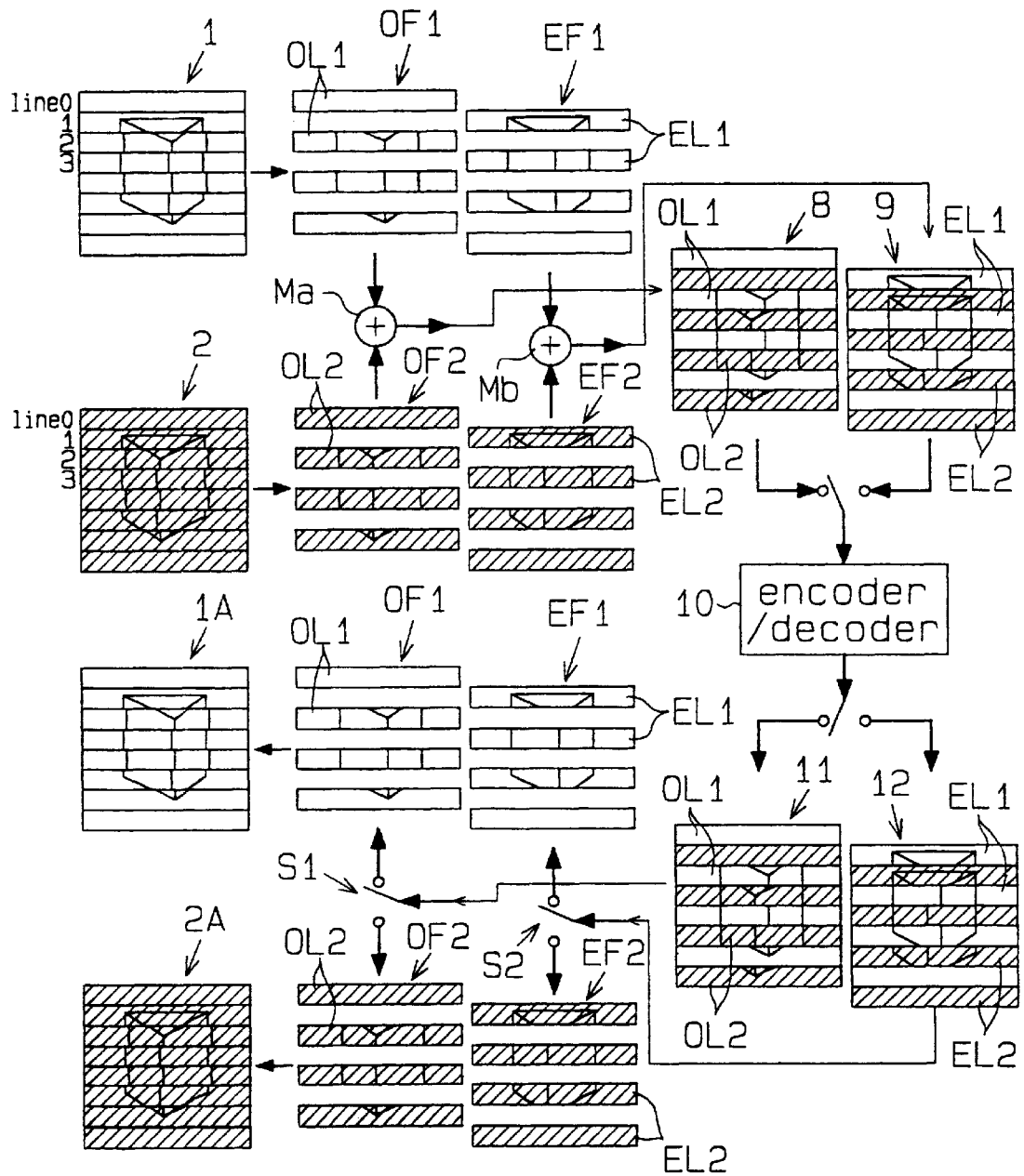
FIG. 2 is a diagram showing the encoding and decoding of a sequence of 3D images according to a second embodiment of the present invention.

In a second embodiment of the invention, as shown in FIG. 2, an interlaced left picture 1 has field pictures OF1 on odd numbered lines OL1 and field pictures EF1 on even numbered lines EL1. The right picture 2 likewise contains field pictures OF2 on odd numbered lines OL2 and field pictures EF2 on even numbered lines EL2. In encoding the left picture 1 and right picture 2, a mixer Ma merges lines OL1 with lines OL2 to form a first field picture 8. A mixer Mb merges lines EL1 from field picture EF1 and lines EL2 from field picture EF2 to form a second field picture 9. The encoder/decoder 10 is designed to be compatible with the frame structure defined by MPEG-2 standards. The encoder section of the encoder/decoder 10 receives and encodes the first field picture 8 as odd-numbered frame image and the second field picture 9 as even-numbered frame image. During encoding process, the encoder/decoder 10 performs DCT on each of odd and even-numbered frames, and selectively performs either inter-frame encoding or inter-field encoding, together with motion compensation. The encoder/decoder 10, then outputs encoded data to an recording apparatus (not shown) equipped with an optical pickup. The recording apparatus records the encoded data on a magneto-optical disk. In the second embodiment, the mixer Ma merges the two odd-numbered field pictures OF1 and OF2 from the left and right pictures to form the first field picture 8. The mixer Mb merges the two even-numbered field pictures EF1 and EF2 of the left and right pictures to form the second field picture 9. This technique improves the efficiency with which each field picture is encoded by the MPEG-2 compliant encoder/decoder 10.

To reconstruct the left and right pictures 1 and 2, encoded data read from the magneto-optical disk by the optical pickup (not shown) is supplied to the encoder/decoder 10. The encoded data is next decoded by the decoder section to reconstruct the first and second field pictures 11 and 12. Both pictures 11 and 12 are then output to a separator S1, which separates the reconstructed first field picture 11 into odd-numbered lines of the field pictures OF1 and OF2. A separator S2 separates the reconstructed second field picture 12 into even-numbered lines of field pictures EF1 and EF2. The above described separating process performed by separators S1 and S2 permits reconstructed left picture 1A to be formed separately from reconstructed right picture 2A. The reconstructed picture 1A is formed from the odd line numbered field picture OF1 and the even line numbered field picture EF1. Likewise the reconstructed picture 2A contains an odd line numbered field picture OF2 and even line numbered field picture EF2. This presents a more efficient and effective method of decoding field pictures into left and right image sequences for left and right eye viewing.

Third Embodiment

Figure 3:
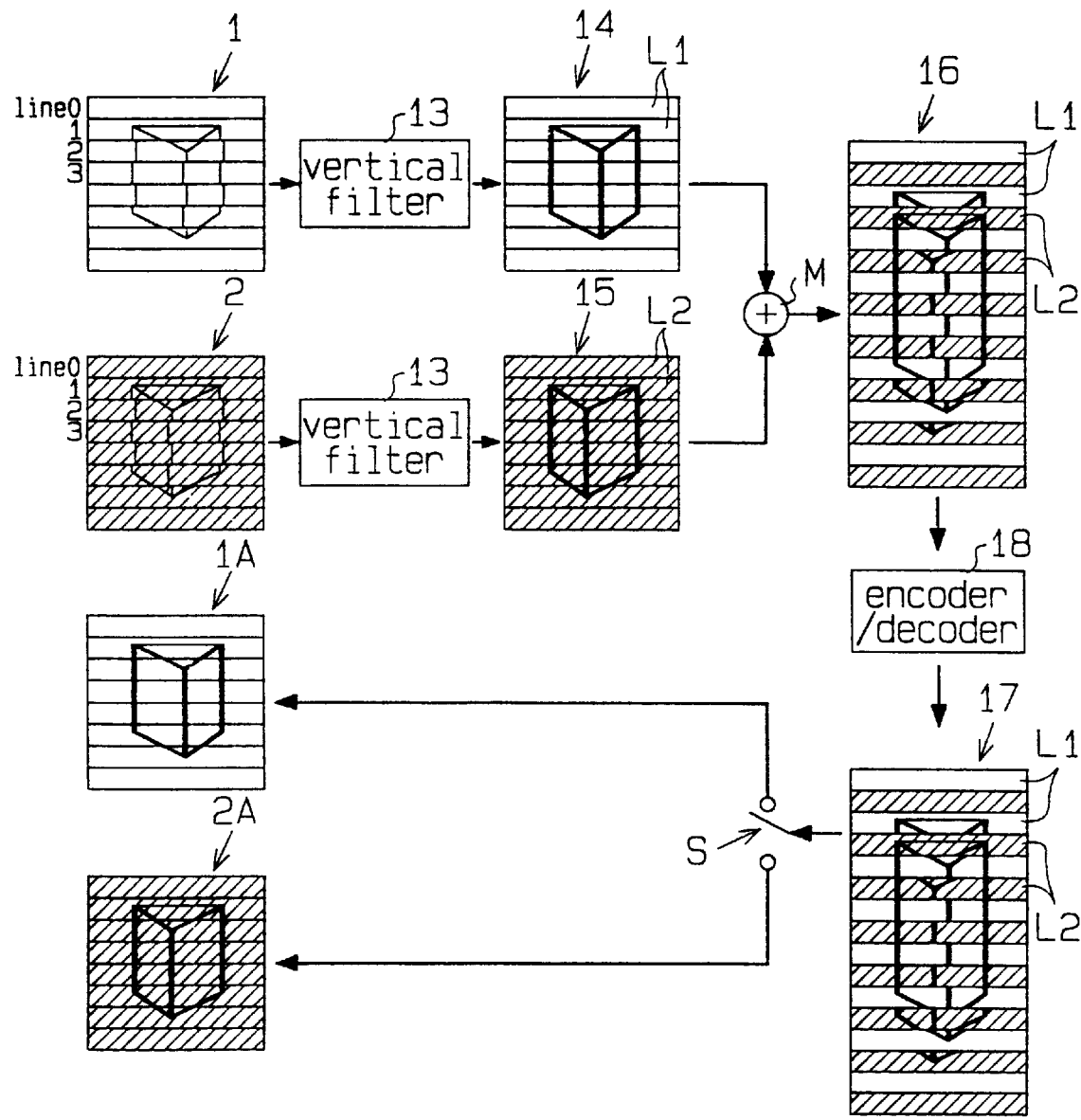
FIG. 3 is a diagram showing the encoding and decoding of a sequence of 3D images according to a third embodiment of the present invention.

A third embodiment of this invention will be discussed below. In this embodiment, the left and right pictures 1,2 are formed as interlaced image sequences. Moreover, none of the even or odd numbered field pictures in the left or right pictures 1,2 are merged. To encode left and right pictures 1 and 2, two vertical filters 13 are used to compensate the phase shifts occurring between the two pictures. This results in a left filtered picture 14 and a right filtered picture 15, a pseudo non-interlaced picture as shown in FIG. 3. The vertical filter 13 determines if the pseudo non-interlaced picture is a single image or a sequence of images. Should the pseudo non-interlaced picture be a single image, the vertical filter 13 does not perform phase compensation. Should the pseudo image turn out to be a sequence of images, the vertical filter 13 performs motion detection and compensates for image deviation based on the size of the motion vector obtained during motion detection. Vertical filters 13, therefore, provide two advantages: they eliminate the need for the filtering a non-interlaced picture, and they prevent the image quality deterioration. A mixer M merges lines L1 of the left filtered picture 14 and lines L2 of the right filtered picture 15 to form a merged picture 16 equivalent to an interlaced picture, as per the first embodiment. An encoder/decoder 18 encodes the merged picture 16, while an optical pickup (not shown) records the encoded data on a magneto-optical disk as in the first embodiment.

In reconstructing the left picture 1 and right picture 2, encoded data read from the magneto-optical disk is decoded by an encoder/decoder 18, to produce a reconstructed merged picture 17. A separator S separates the reconstructed merged picture 17 into left and right pictures 1A and 2A, respectively. The third embodiment eliminates the need for the mixers Ma and Mb by forming pseudo non-interlaced pictures of the left picture 1 and right picture 2 via the vertical filters 13. Each of these mixers merge the field pictures in pictures 1 and 2 in a field by field method. Thus, according to the third embodiment, the present invention eliminates the need to merge interlaced picture code.

First Example of First Embodiment

A detailed example according to the first embodiment will now be described with reference to FIGS. 4 through 14. FIG. 4 schematically illustrates an apparatus to encode a 3D image sequence signal. The apparatus comprises a mixer 20 and an MPEG-1 compliant encoder 22. As shown in FIG. 5, the mixer 20 receives simultaneous input of a right-eye image sequence RV and a left-eye image sequence LV. The mixer 20 then merges both sequences, line by line, to produce a merged picture signal DV having a twice the number of vertical lines present in signals RV or LV. The MPEG-1 encoder 22 then receives and encodes the merged picture signal DV from the mixer 20. An optical pickup 24 receives the encoded data, output from the MPEG-1 encoder 22, and records the data on a magneto-optical disk 26.

Figure 6:
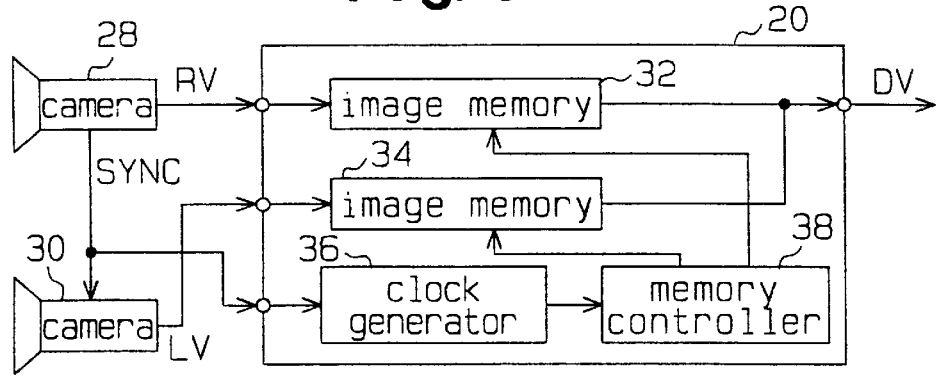
Figure 7:
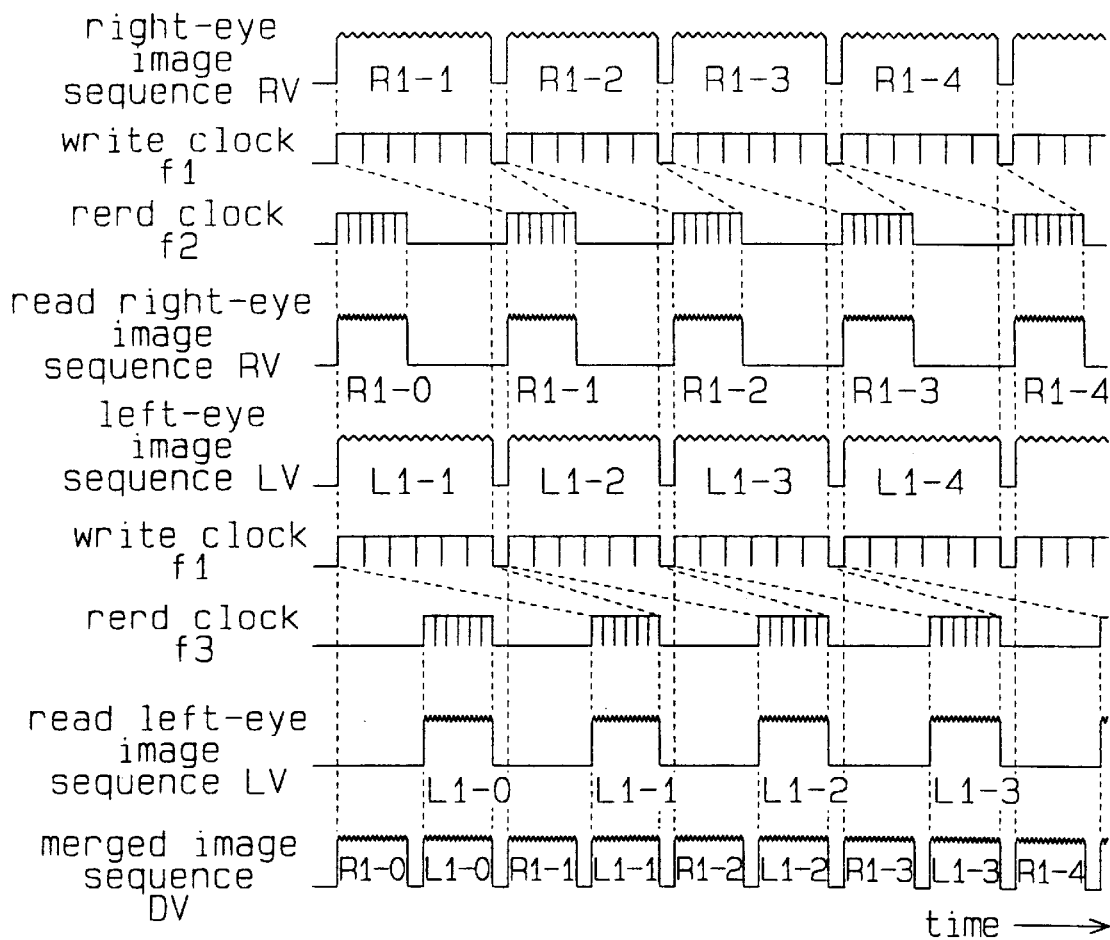

FIG. 6 presents a block circuit diagram of the mixer 20. In FIG. 6, the mixer 20 includes a first image memory 32 for storing a right-eye picture signal RV sensed by a first camera 28, a second image memory 34 for storing a left-eye picture signal LV sensed by a second camera 30. The mixer 20 also includes a clock generator 36 and a memory controller 38. The first camera 28 outputs a sync signal SYNC to the second camera 30 and clock generator 36. Consequently, the second camera 30 operates in synchronism with the sync signal SYNC. The clock generator 36 generates a clock signal in synchronism with the sync signal SYNC and outputs the clock signal to the memory controller 38. In response to the clock signal from the clock generator 36, the memory controller 38 produces a write clock signal $f_1$ shown in FIG. 7 and outputs it to the first and second image memories 32 and 34. In response to the write clock signal $f_1$, the first image memory 32 stores the right-eye picture signal RV, line by line (indicated by R1-1, R1-2 and so forth). Likewise, the second line memory 34 stores the left-eye picture signal, LV line by line (indicated by L1-1, L1-2, etc.). Further, in response to the write clock signal $f_1$, the memory controller 38 synchronously produces a first read clock signal $f_2$ having a frequency double the frequency of the signal $f_1$. The controller 38 provides signal $f_2$ to the first image memory 32. In response to the first read clock signal $f_2$ and after a predetermined delay, the memory controller 38 produces a second read clock signal $f_3$, having a frequency double the frequency of the write clock signal $f_1$. The controller 38 then outputs the signal $f_3$ to the second image memory 34. The first image memory 32 outputs the right picture signal RV, compressed to half its original size, to the encoder 22 line by line in response to the first read clock signal $f_2$. In response to the second read clock signal $f_3$, the second image memory 34 outputs the left picture signal LV, compressed to half its original size, to the encoder 22 line by line. Output from the memory 34 is delayed by the output of the right picture signal RV. Mixer 20, thus, merges the left and right image sequences of the left and right image signals, line by line, to produce a merged picture signal DV, and outputs to the encoder 22.

Figure 8:
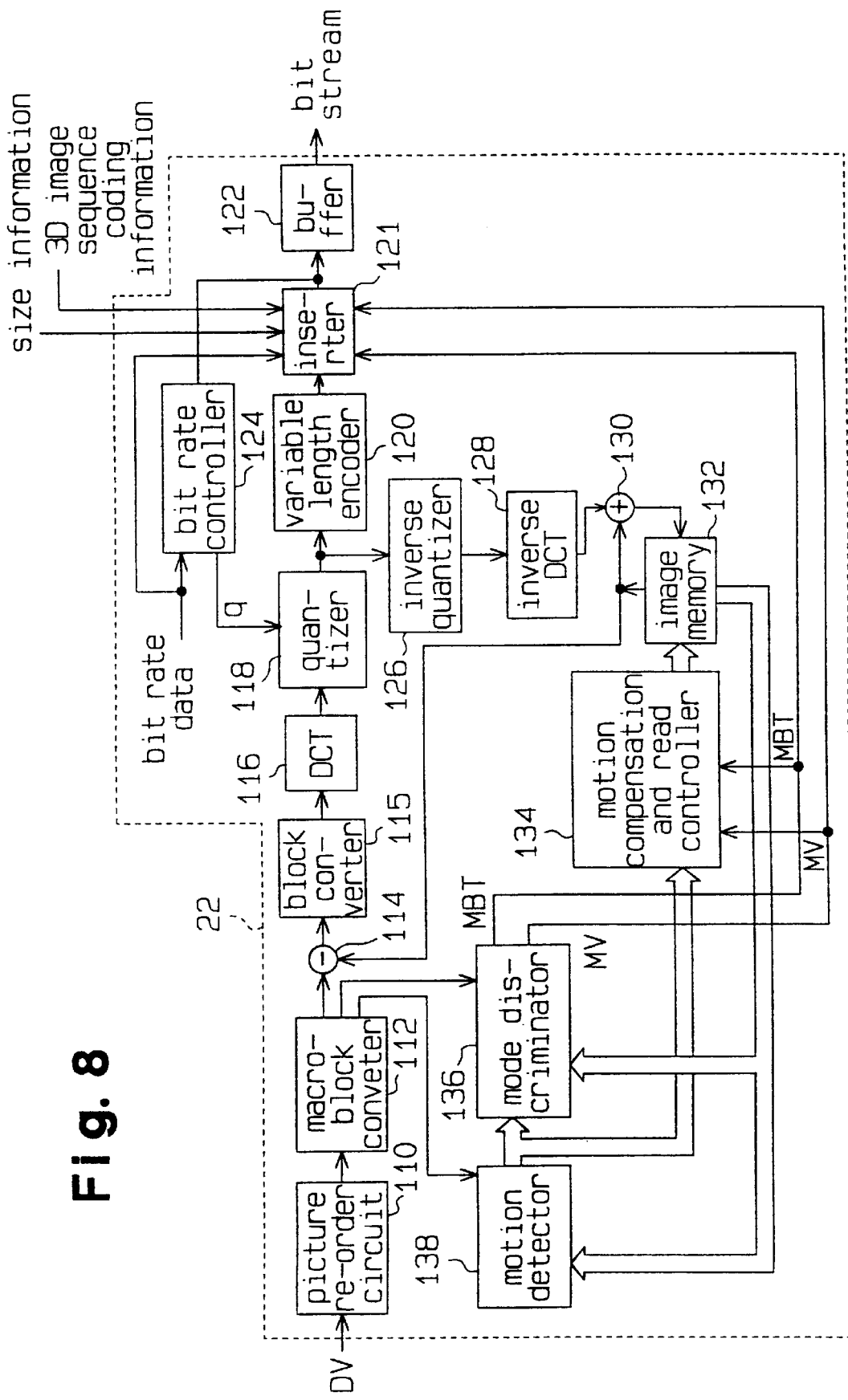

FIG. 8 presents a block circuit diagram of the MPEG-1 compliant encoder 22. The encoder 22 comprises a picture re-order circuit 110, a macroblock converter 112, a subtractor 114, a block converter 115, a DCT 116, a quantizer 118, a variable-length encoder 120, an inserter 121, a buffer 122, a bit rate controller 124, an inverse quantizer 126, an adder 130, an image memory 132, a motion compensation and read controller 134, a mode discriminator 136 and a motion detector 138. The picture re-order circuit 110 receives the merged picture signal DV from the mixer 22, and rearranges the order of the frames (pictures) forming the merged picture. When the current frame is encoded with reference frame following the current frame, the picture re-order circuit 110 rearranges the current frame and the reference frame in such a way as to output the reference frame first.

Figure 9:
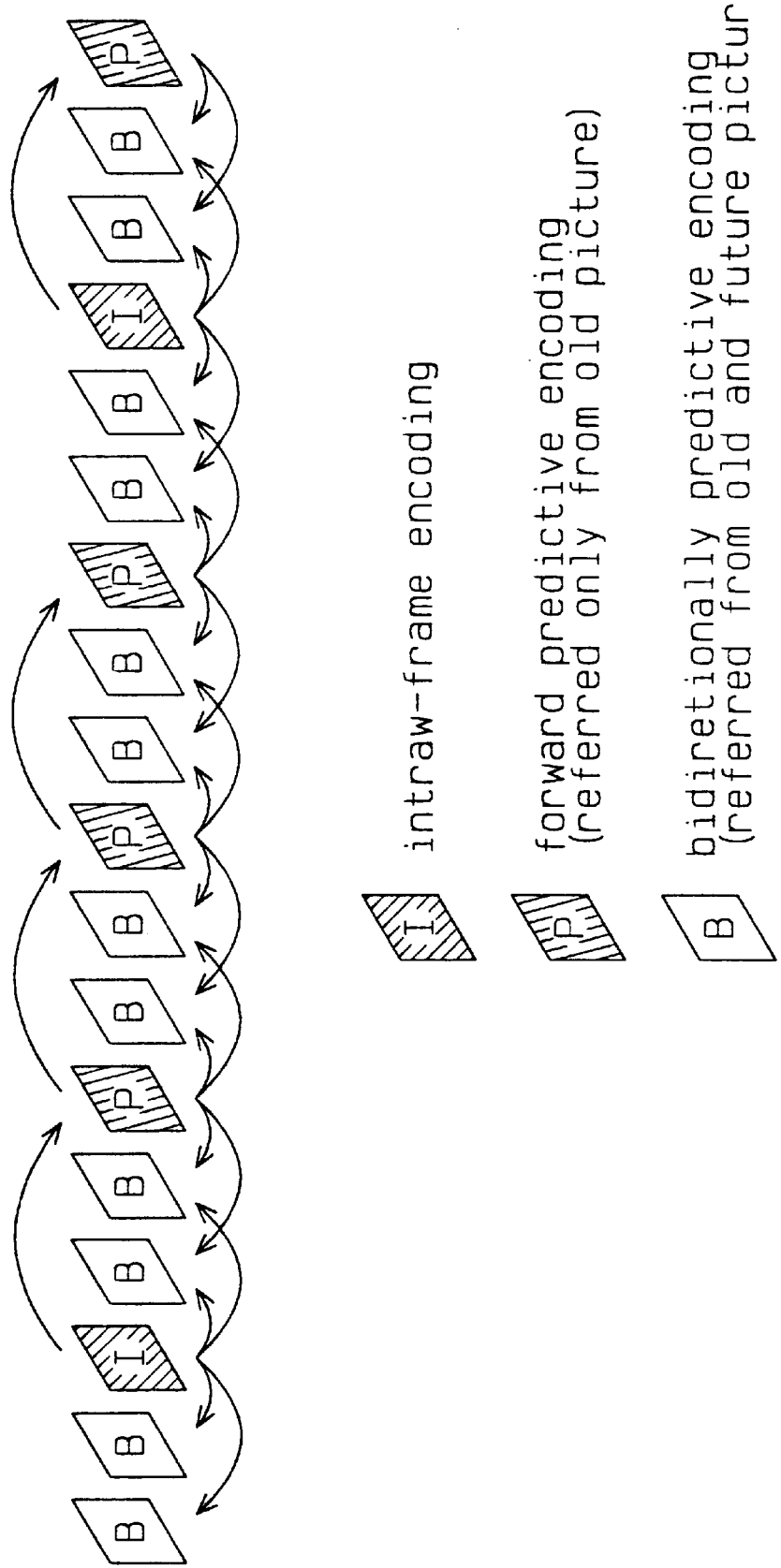

As shown in FIG. 9, there are three types of encoded frames. The first type, called an intra-frame encoded picture (I-picture), is encoded without using a reference frame. The second type of frame, called a predictive-coded picture (P-picture), follows the decoded intra-coded picture in sequence. The third type of frame, called a bidirectionally predictive coded picture (B picture), either proceeds or follows a decoded intra-coded I-picture and/or predictive coded P-picture in sequence. Bidirectional predictive encoding of B-pictures is done by reference to decoded I picture and/or P-pictures as reference frames. Forward predictive encoding of P-pictures is done by reference only to decoded I pictures.

Figure 10:
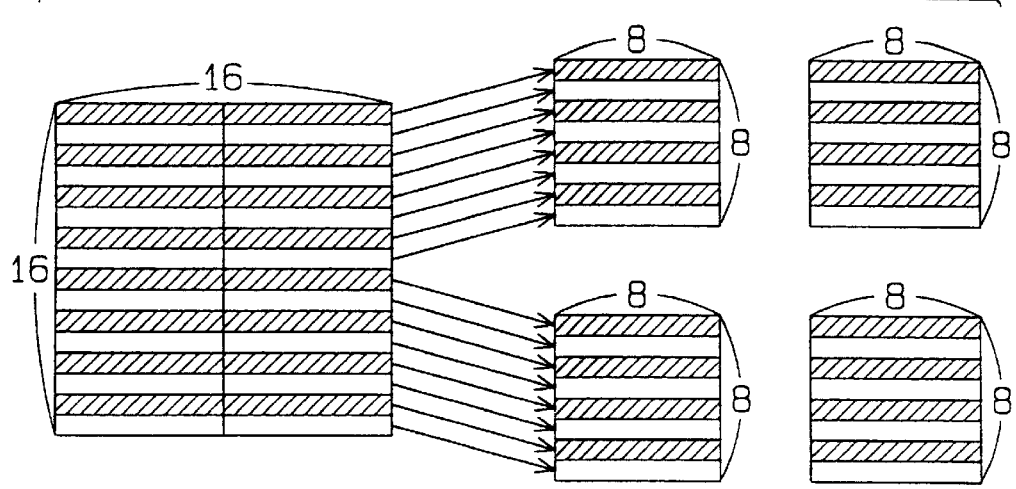
Figure 11:
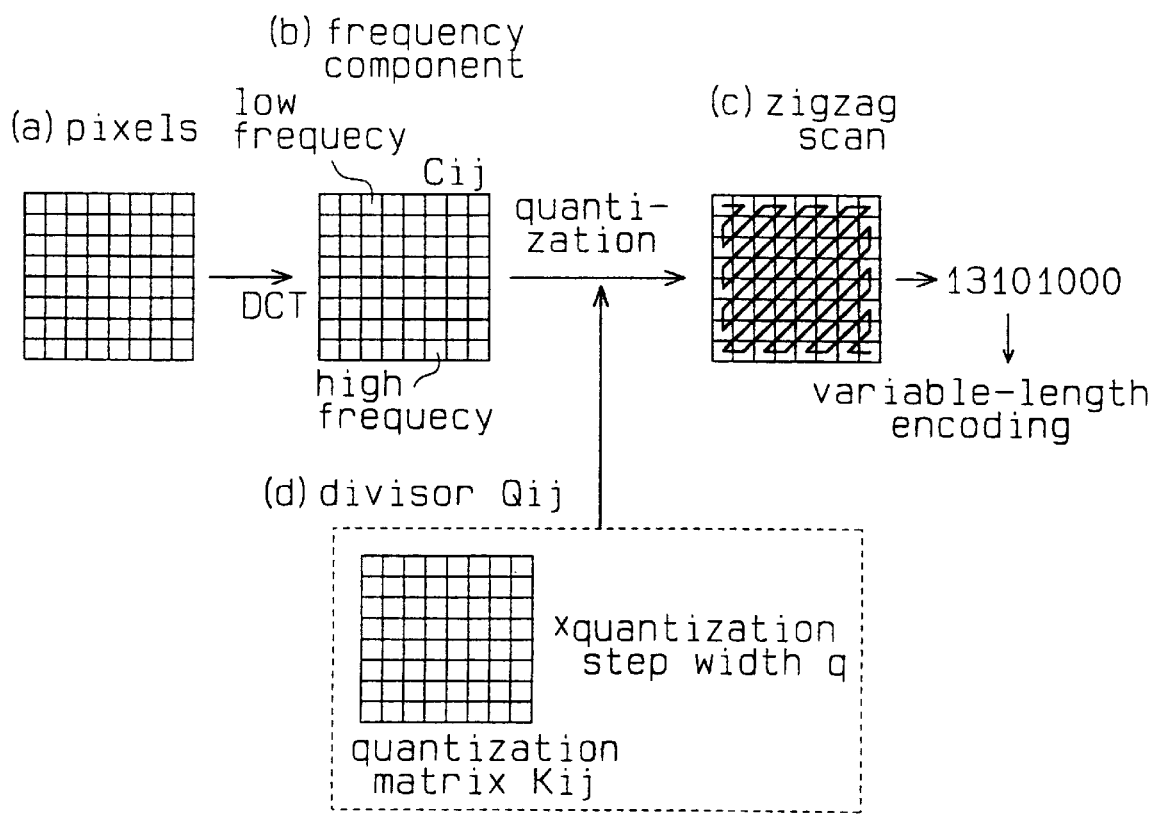

Forward and bidirectional predictive encoding techniques are used on a macroblocks divided into P or B type pictures. Macroblocks which undergo forward or bidirectional predictive encoding are called inter-macroblocks. Macroblocks which do not undergo forward or bidirectional predictive encoding are called intra-macroblocks. The macroblock converter 112 scans and converts each frame output from the picture re-order circuit 110 into a plurality of macroblocks containing 16×16 block of pixels. Those are provided by the converter 112 to the motion detector 138 and the subtractor 114. The subtractor 114 takes a reference macroblock from a reference frame output from the image memory 132, and subtracts it from the current macroblock of the current frame output from the macroblock converter 112. The subtractor 114 outputs the difference as difference data. The block converter 115 divides each 16×16 pixel macroblock into four blocks of 8×8 pixels, as shown in FIG. 10. The DCT 116 performs discrete cosine transformation block by block to break down each block into its constituent low and high frequency components. This provides an 8×8 coefficient matrix (Cij) having coefficients Cij of each frequency term (a) to (b), as shown in FIG. 11. The quantizer 118 divides each coefficient Cij, obtained by the DCT 116, by a divisor Qij (=Kij×q) for quantization. Kij is a constant given by a quantization matrix table and q is a quantization step width output from the bit rate controller 124. The quantizer 118 sequentially outputs the coefficient data Cij for the low to high frequency components. The variable-length decoder 120 performs variable-length encoding on the coefficient data Cij output from the quantizer 118 to produce a bit stream. The bit rate controller 124 compares the bit rate of the bit stream output from the inserter 121, via the variable-length encoder 120, with the target value and determines the quantization step width q in order to set the bit rate to the target value. The controller 124 decreases the quantization step width q when the bit rate is smaller than the target value, and increases the quantization step width q when the bit rate is larger than the target value. The target value of the bit rate is provided via an encoding controller (not shown).

The inverse quantizer 126 and inverse DCT 128 effectively reverse the operations of the quantizer 118 and the DCT 116 to decode quantized picture data into original picture data. The decoded picture data is output to the adder 130. When the decoded picture data is an inter-macroblock (difference data produced by the subtractor 114), the adder 130 adds the reference frame macroblock data, output from the image memory 132, to the difference data. The resulting data reconstructs the reference frame. The image memory 132 can store at least two reference frames provided by the adder 130. Possible reference frame combinations are an I-I pictures, I-P pictures and P-P pictures. Reference frame or reference macroblock data is output from the image memory 132 to the motion detector 138, the mode discriminator 136, the subtractor 114 and the adder 130 under the control of the read controller 134.

Figure 12:
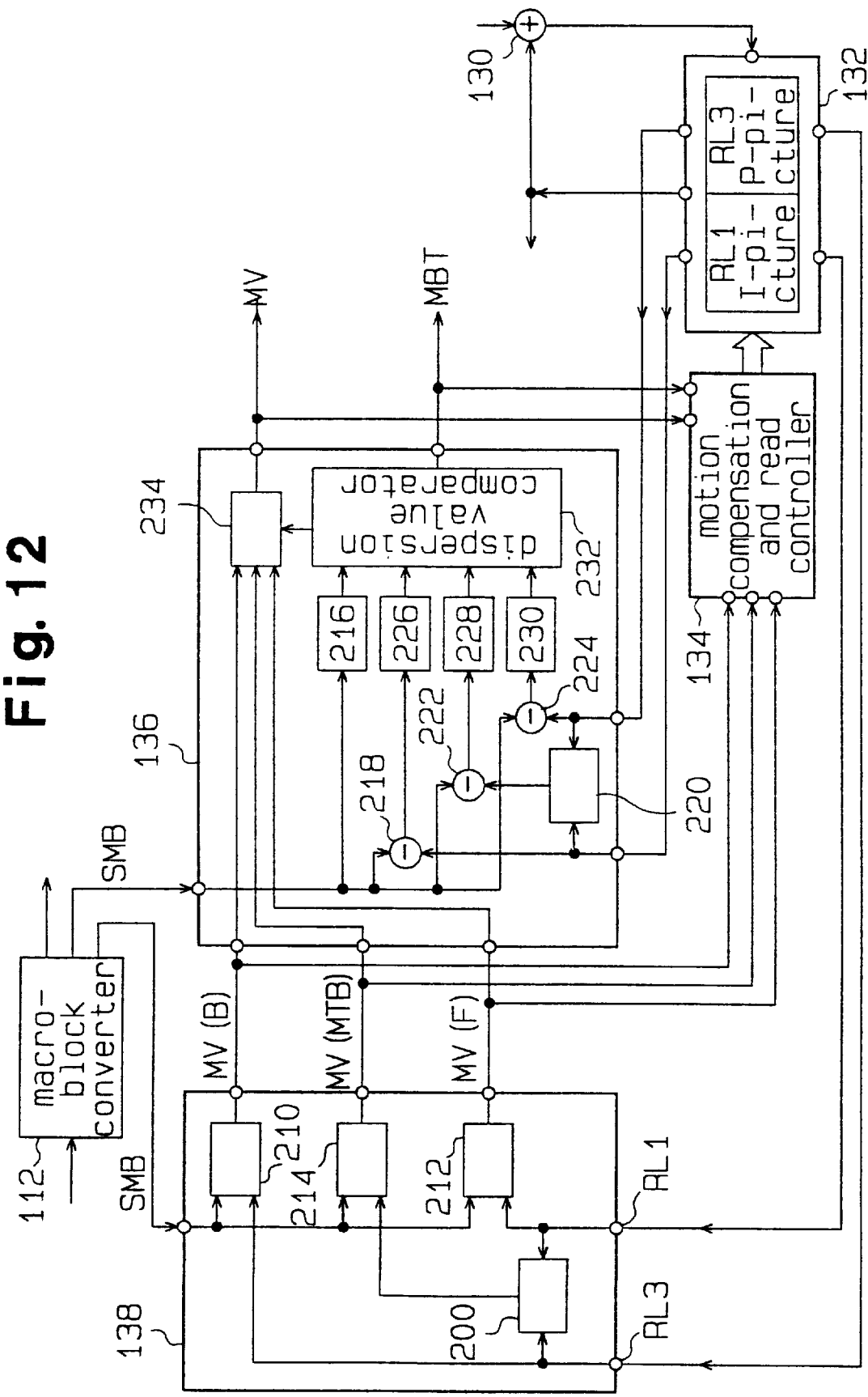
Figure 13:
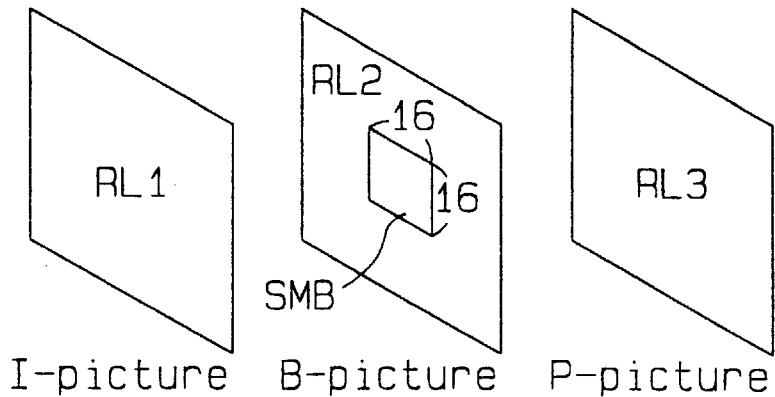
Figure 14A:
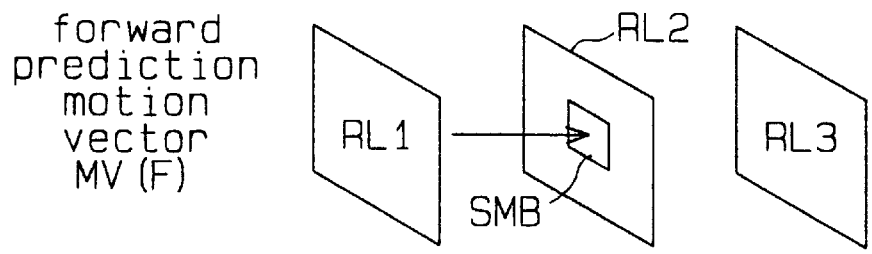
Figure 14B:
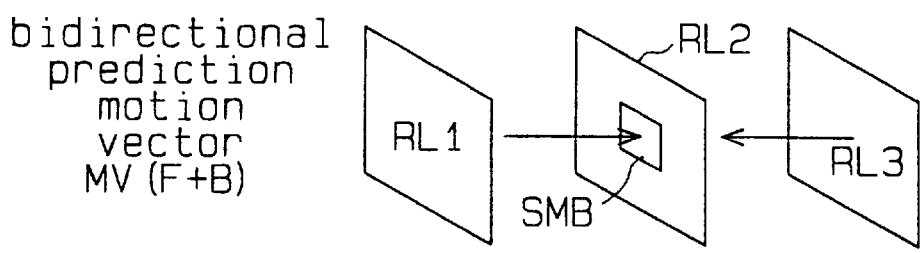
Figure 14C:
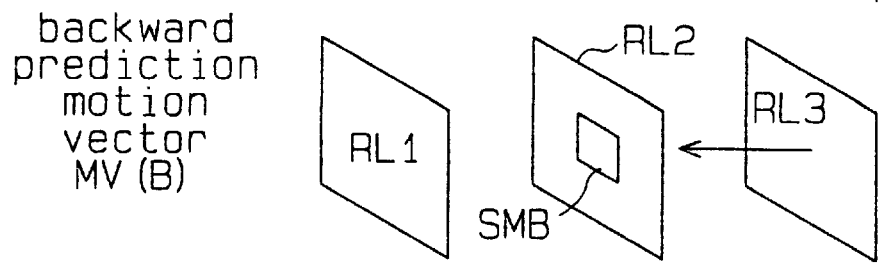

A detailed description will now be given of the motion detector 138, the mode discriminator 136 and the read controller 134 as illustrated in FIGS. 12 to 14. The image memory 132 stores, for example, a decoded I-picture RL1 and P-picture RL3. The macroblock converter 112 outputs the macroblock SMB containing a B-picture, as shown in FIG. 13, to the motion detector 138 and to the mode discriminator 136. The motion detector 138 includes an averaging circuit 200, and three motion vector detectors 210, 212 and 214. The averaging circuit 200 receives an I-picture and P-picture output from the image memory 132. Characteristics of both pictures such as luminance, chrominance etc. are then averaged. The averaged values are then output to the third motion vector detector 214. The first detector 210 compares the current macroblock SMB with the P-picture in order to identify the reference macroblock most similar to the current macroblock SMB. The first detector 210 detects a motion vector MV(B). This vector MV(B) indicates the position of the reference macroblock. This vector distinguishes the difference in the coordinates of picture P upon it being moved from a first to a second location. The first position coordinates correspond to the coordinates of the current macroblock. Motion vector MV(B) is thus used during so called backward prediction, as illustrated in FIG. 14C.

The second motion vector detector 212 identifies the reference macroblock most similar to the current I-picture macroblock SMB. The detector 212 also detects a motion vector MV(F) indicative of the position of the reference macroblock. This motion vector MV(F) is used during forward prediction as illustrated in FIG. 14A. The third motion vector detector 214 identifies the reference macroblock most similar to the current macroblock SMB from the I-P averaged picture. The vector detector 214 then detects a motion vector MV(F+V) which indicates the position of the reference macroblock identified as most similar to the macroblock SMB. Motion vector MV(F+B) corresponds to the bidirectional prediction encoding as illustrated in FIG. 14B.

The first to third detectors 210, 212 and 214 output respective motion vectors MV(B), MV(F) and MV(F+B) to the mode discriminator 136 and the read controller 134. Based on the motion vector MV(F), the read controller 134 reads the reference macroblock associated with the I-picture from the memory 132 and outputs it to the mode discriminator 136. Based on the motion vector MV(F+B), the read controller 134 reads the reference macroblocks associated with the I and P pictures from memory 132 and outputs those macroblocks to the mode discriminator 136. Based on the motion vector MV(B), the read controller 134 reads the reference macroblock associated with the P-picture from the memory 132, and outputs it to the mode discriminator 136.

The mode discriminator 136 has an averaging circuit 220, four dispersion value calculators 216, 226, 228 and 230, a dispersion value comparator 232, three subtractors 218, 222 and 224, and a selector 234. The first calculator 216 calculates the dispersion value or activity of the current macroblock SMB (intra-macroblock) at a time following its output from the macroblock converter 112. This dispersion value indicates the flatness of the frame. The first subtractor 218 determines the difference between the current macroblock SMB and the reference macroblock obtained by the forward prediction. The second calculator 226 calculates a dispersion value based on this difference. The second subtractor 222 determines the difference between the current macroblock SMB and the bidirectional-prediction oriented reference macroblock produced by the averaging circuit 220. The third calculator 228 calculates a dispersion value according to this difference obtained by the second subtractor 222. The third subtractor 224 determines the difference between the current macroblock SMB and the backward-prediction oriented reference macroblock. The fourth calculator 230 calculates a dispersion value using the difference provided by the third subtractor 232. The dispersion value comparator 232 compares the individual dispersion values output from the calculators 216, 226, 228 and 230, and outputs macroblock information MBT. MBT information represents the type of macroblock minimizing dispersion value, according to any one of four encodings: current macroblock intra mode coding, forward prediction coding, backward prediction coding or bidirectional coding. Forward, Backward and bidirectional modes of coding are considered to be inter mode coding.

During inter-mode coding, the comparator 232 outputs a control signal to the selector 234 which causes the selector 234 to output the associated motion vector to the read controller 148 and the inserter 121. When the dispersion value from the calculator 230 is the smallest produced by all four calculators, the comparator 232 outputs a backward-prediction oriented inter-mode macroblock MBT. The selector 234 then outputs the motion vector MV(B) to the read controller 134. Based on the motion vector MV, the read controller 134 outputs a read control signal for the associated reference macroblock to the memory 132. This allows the mode discriminator 136 to select the most efficient compression scheme from one of the following choices: intra mode or forward predictive encoding, as illustrated in FIG. 14A; bidirectional predictive encoding, as illustrated in FIG. 14B; or backward predictive encoding, as illustrated in FIG. 14C. This scheme contributes to improving the efficiency of 3D image sequence compression.

As shown in FIG. 8, the inserter 121 provides the bit stream, output from the variable-length encoder 120, with various types of information. At a minimum, this information includes data regarding:

(1) frame size of the merged left and right pictures provided by an external device, (2) coding of the 3D image sequences, (3) macroblock information MBT, output from the mode discriminator 136, (4) motion vector information MV, output from the mode discriminator 136, and (5) optimum bit rate data output from the encoding controller (not shown).

Examples of what is meant by 3d image sequence code related information includes: whether or not the encoded data is 3D image sequence data, the method of merging right and left image sequences, and whether or not a picture, prior to being encoded, is interlaced. Following it's output from the inserter 121, the bit stream is temporarily stored in the buffer memory 122. From there it is output at a predetermined bit rate.

According to the first example, as described above, the mixer 20 merges the right picture and the left picture with a high degree of correlation into a single picture, line by line, for encoding by encoder 22. The MPEG-1 encoder 22 detects the correlation between both pictures by examining the difference between the current frame and the reference frame. Once the correlation is determined, the encoder selects the coding method having the highest compression ratio, and encodes the merged 8×8 pixel picture blocks, block by block. The encoder 22 of the present invention, thus, improves 3D image sequencing compression.

Second Example of First Embodiment

Figure 15:
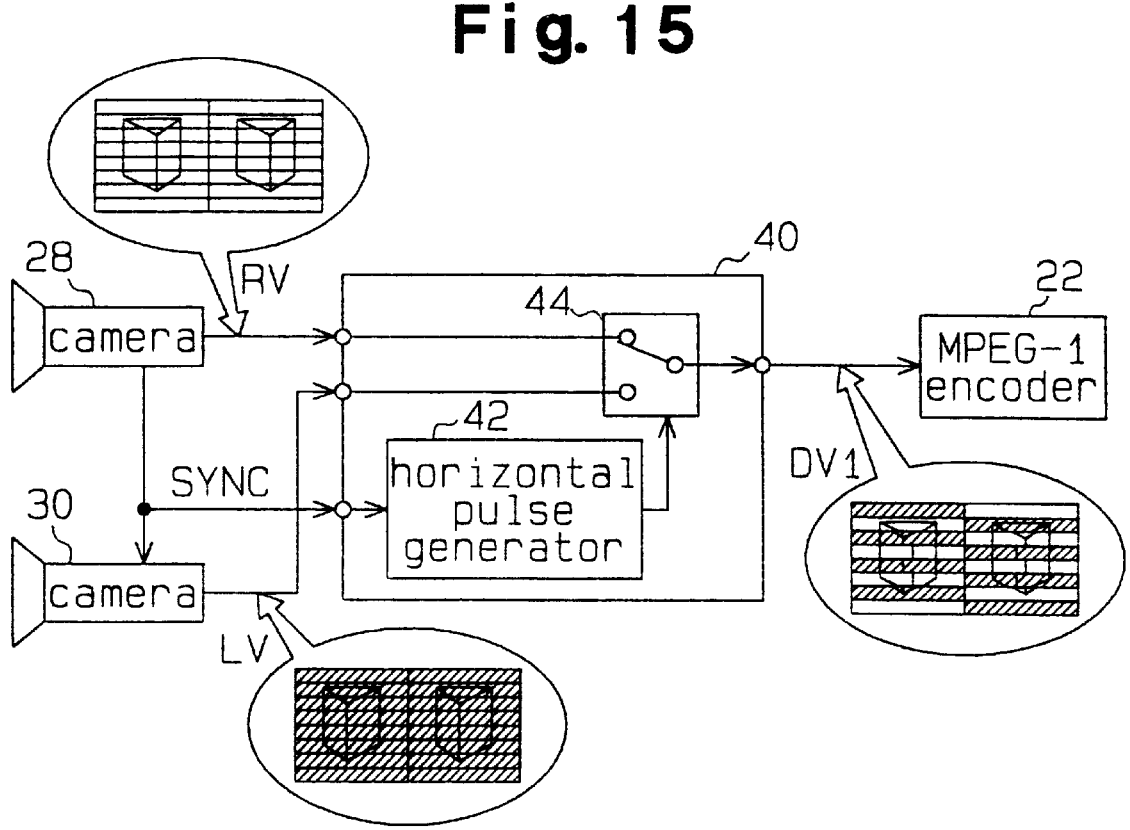
FIG. 15 is a block diagram showing a mixer and an MPEG-1 compliant encoder in a second example according to the first embodiment.

A more detailed second example according to the first embodiment will now be described with reference to FIG. 15. As shown in FIG. 15, a mixer 40 has a horizontal pulse generator 42 and a switch 44. In response to a sync signal SYNC from the first camera 28, the horizontal pulse generator 42 produces a pulse signal to invert the horizontal scanning period. The pulse signal is output to the switch 44. The switch 44 receives the left and right image sequence signals from the first and second cameras 28 and 30, and switches during each horizontal scanning period in response to the pulse signal. The switching alternates the output of the right and left image sequence signals, line by line. Unlike the first example which reads the right and left image sequence signals at a double speed and merges those signals, the second example alternately outputs the right picture and left picture line by line. This produces a merged picture sized the same as the frame forming the right and left pictures. The encoder 22 receives and encodes this merged picture from the mixer 40. Because merged picture's frame size in the second example differs from the frame size in the first example, the value set for the size of the processed frame in the MPEG-1 encoder 22 should be changed.

Third Example of First Embodiment

Figure 16:
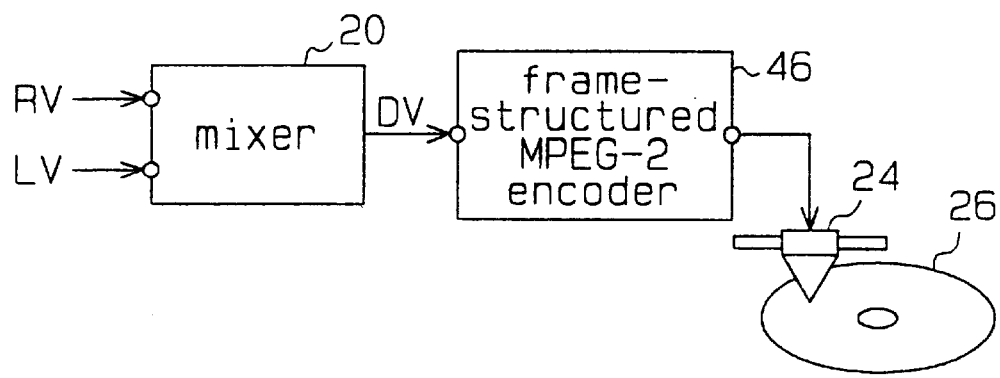
FIGS. 16 through 23, 24A through 24H, and 25A through 25H illustrate a third example of the present invention according to the first embodiment.

A third example according to the first embodiment will now be described with reference to FIGS. 16 to 25. As shown in FIG. 16, a 3D image sequence encoding apparatus comprises the mixer 20 and an MPEG-2 compliant encoder 46 set up in a frame structure mode. The mixer 20, like the mixer in the first example, merges right and left image sequences RV, LV in alternating fashion, line by line, to produce a merged picture DV. The number of vertically scanned horizontal lines in picture DV is doubled from that of either picture LV or RV. The MPEG-2 encoder 46 encodes the merged picture DV, and the optical pickup 24 records the encoded data on the magneto-optical disk 26.

Figure 17:
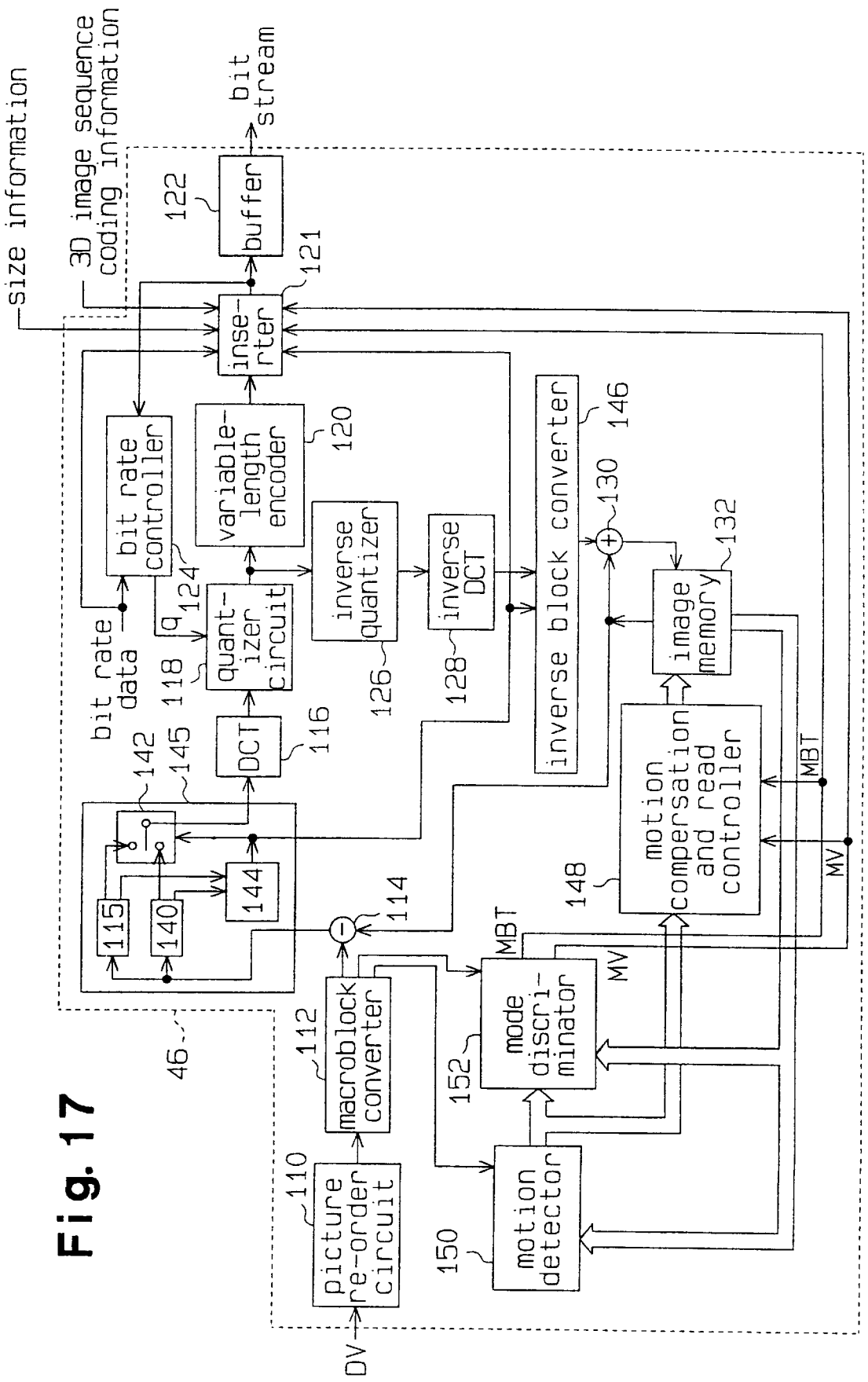
Figure 18:
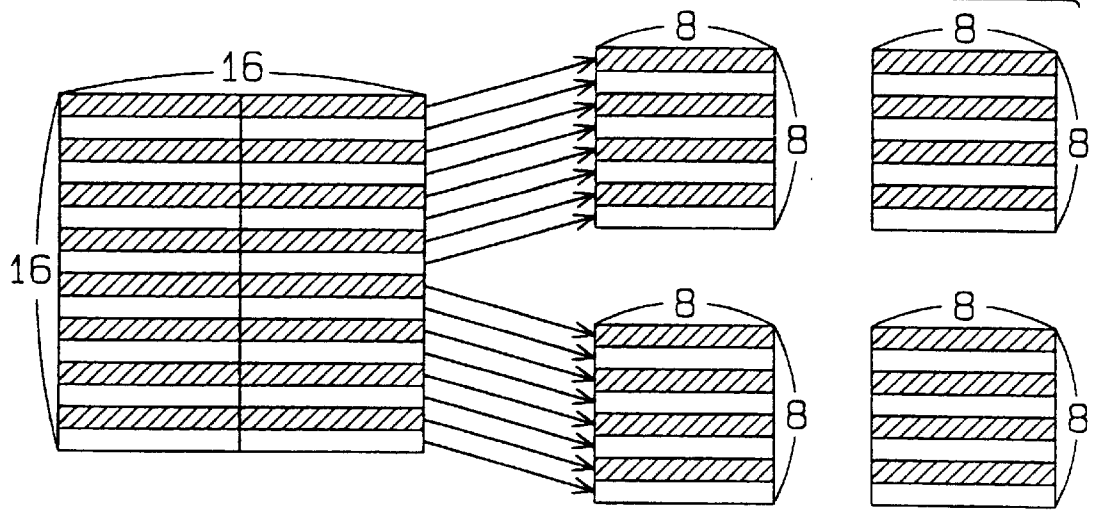
Figure 19:
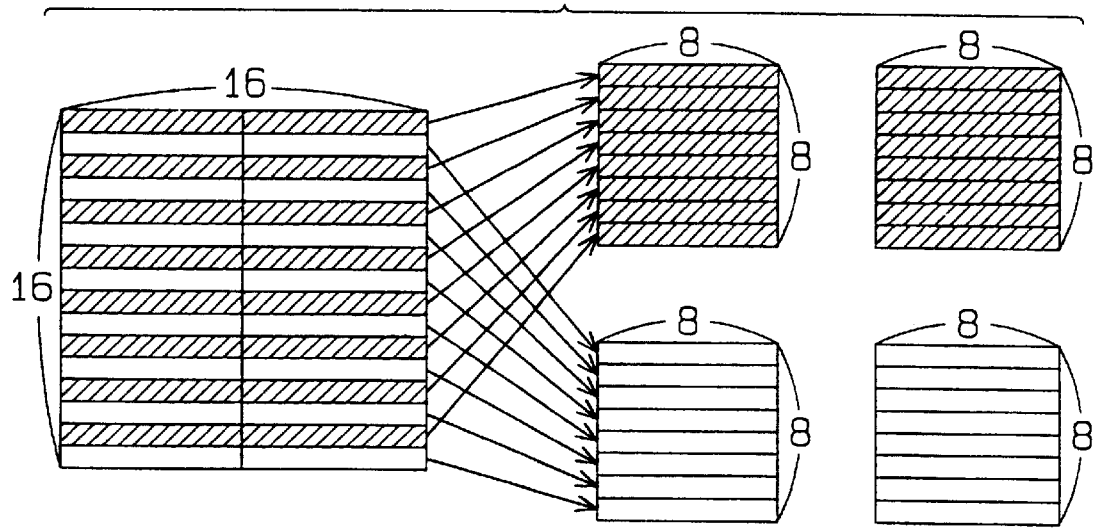

FIG. 17 presents a block circuit diagram of the MPEG-2 encoder 46. For clarity, the reference numerals used for components of the encoder 22 described in the first example will again be used for this example. The encoder 46 further includes a frame/field block converter 145 and an inverse frame/field block converter 146. The block converter 145 has first and second block converters 115 and 140, a switch circuit 142 and a mode selector 144. The first block converter 115, like the block converter 115 in the first example, converts a 16×16 pixel macroblock into four 8×8 pixel frame blocks in preparation for DCT operations, as shown in FIG. 18. During the conversion, odd-numbered lines of the four frame block are used to form the frame block in the right picture. Similarly, even-numbered lines, from the four frame block image, are used for the left picture. The second block converter 140 converts a 16×16 pixel macroblock into four blocks: two 8×8 pixel "first" field blocks and two 8×8 pixel "second" field blocks, as shown in FIG. 17. During this conversion, all the lines in each of the first field blocks are formed by the right picture, and all the lines in each of the second field blocks are formed by the left picture. The first and second block converters respectively supply the frame blocks and first and second field blocks to the mode selector 144, which in turn calculates the dispersion values (or activities) for those blocks. The mode selector 144 compares the dispersion values of the frame blocks with the dispersion values of the first and second field blocks and produces a mode signal indicative of the block type having a smaller value. The selector 144 sends this mode signal to the switch circuit 142, the inserter 121 and the inverse frame/field block converter 146. In response to the mode signal, the switch circuit 142 selectively outputs either the entire set of frame blocks or the first and second field blocks to the DCT 116. The inverse block converter 146 converts the first and second field blocks, output from the inverse DCT 128, into a macroblock with merged right and left images. These merged images are then output to the adder 130. The inverse block converter 146 converts the frame blocks, output from the inverse DCT 128, into a macroblock in accordance with the mode signal, and outputs the macroblock to the adder 130.

Figure 20:
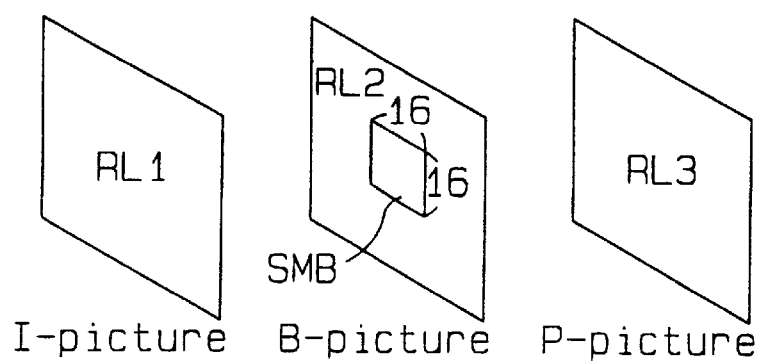
Figure 21:
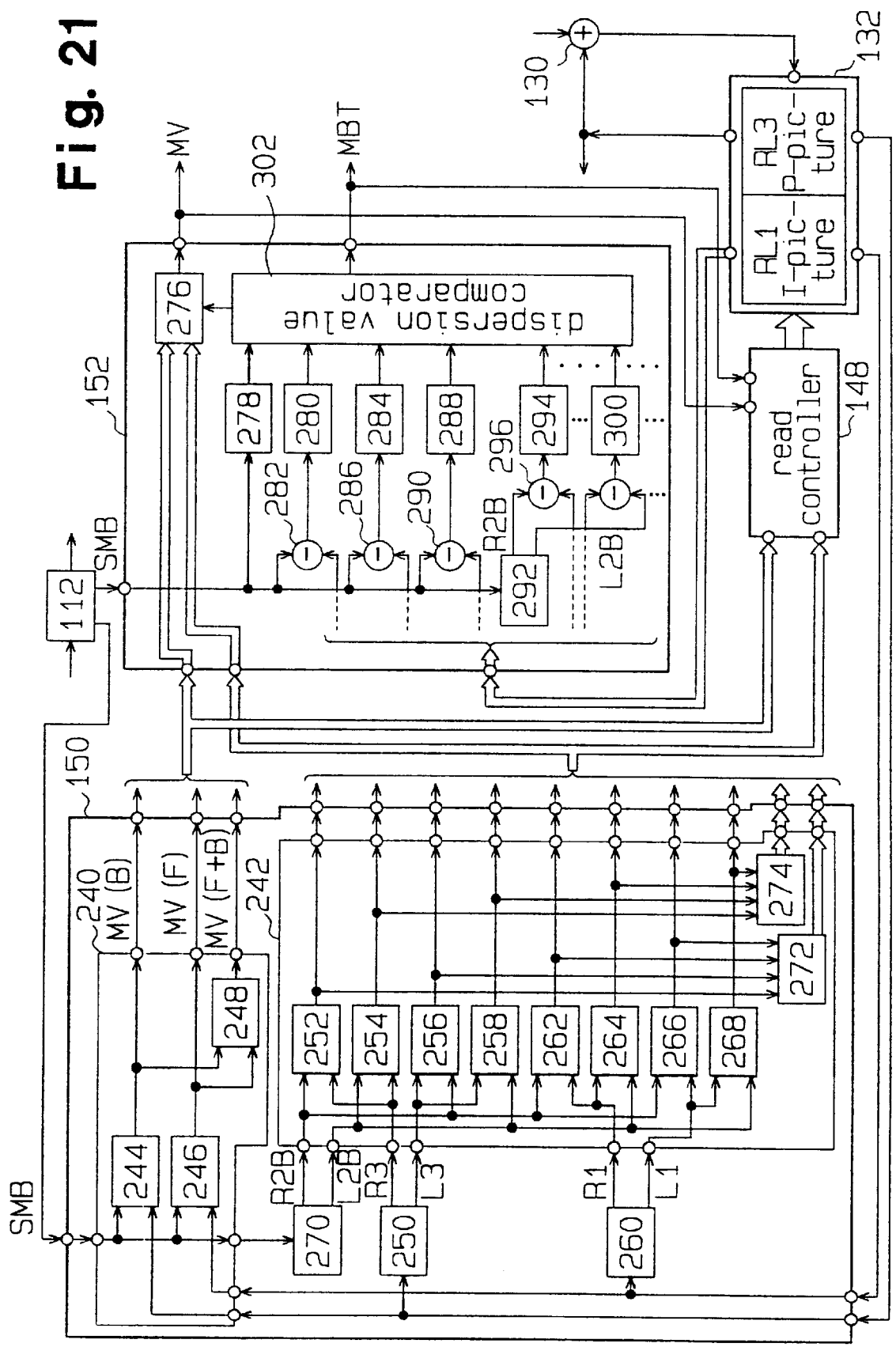

The details of a motion detector 150 and a mode discriminator 152, as shown in FIG. 21, will be now be discussed in detail. The following explanation assumes that the image memory 132 stores a decoded I-picture RL1 and a decoded P-picture RL3, as shown in FIG. 20. A further assumption is that the macroblock converter 112 produces a macroblock SMB containing a B-picture RL2, between the I-picture RL1 and the P-picture RL3. This macroblock is output to both the motion detector 150 and the mode discriminator 152.

Motion Detection

The motion detector 150 includes first and second circuits 240 and 242, both of which detect and produce a motion vector oriented in inter-frame prediction fashion. The detector 150 further includes first and second separators 250 and 260.

(1) Detection of an Inter-Frame Prediction Oriented Motion Vector

Figure 22:
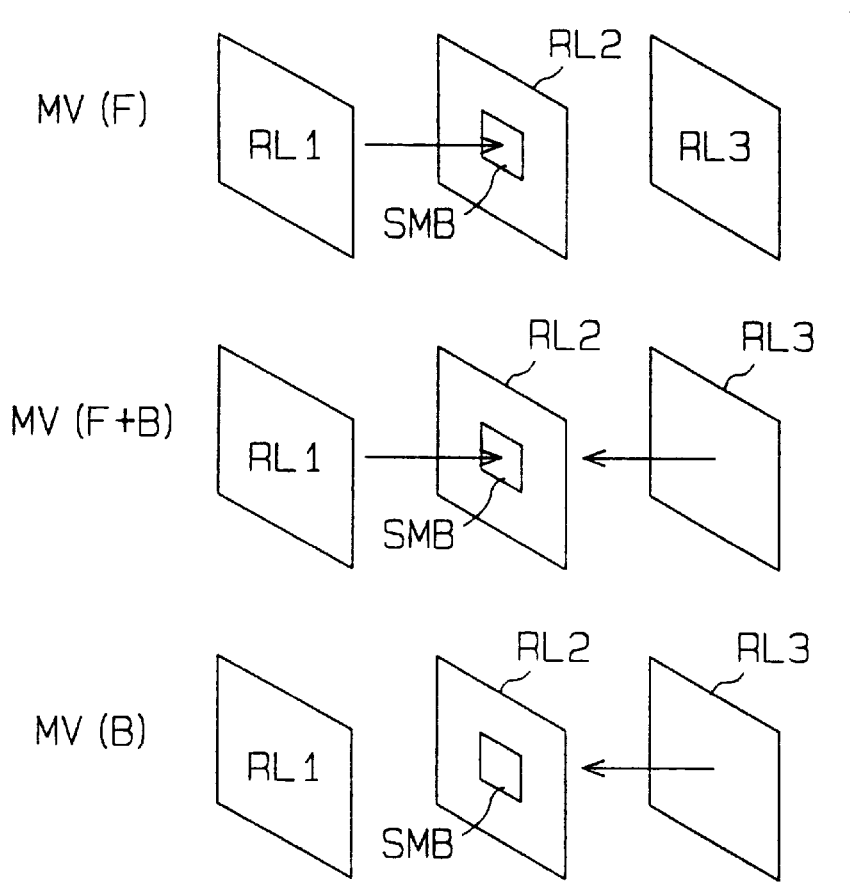

The first circuit 240 has first and second motion vector detectors 244 and 246 and an averaging circuit 248. The first detector 244 searches the P-picture RL3, output from the image memory 132, for the reference macroblock most similar to the macroblock SMB output from the macroblock converter 112. As shown in FIG. 22, the first detector 244 detects the backward motion vector MV(B) indicating the position of the reference macroblock. Likewise, the second detector 246 detects the forward motion vector MV(F) using the current macroblock SMB and I-picture RL1. The averaging circuit 248 averages the vectors MV(F) and MV(B) to produce a bidirectional (or interpolative) motion vector MV(F+B). As described above, the first circuit 240 sends three types of inter-frame prediction oriented motion vectors to the read controller 148 and mode discriminator 152.

(2) Detection of an Inter-Field Prediction Oriented Motion Vector

Figure 23:
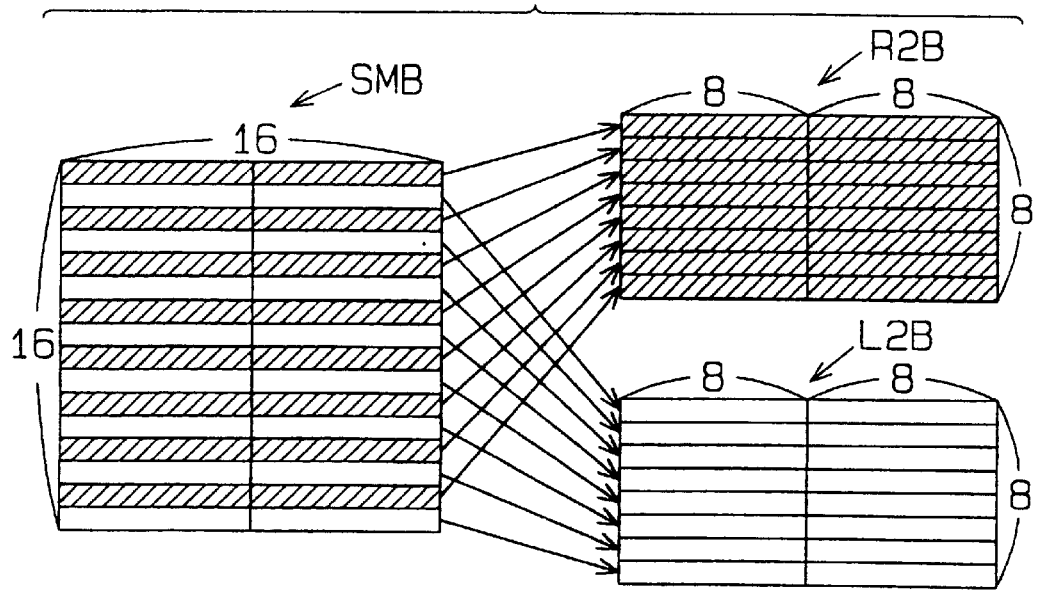

The second circuit 242 has a 16×8 pixel output circuit 270, first to eighth motion vector detectors 252, 254, 256, 258, 262, 264, 266 and 268, and first and second motion vector generators 272 and 274. The first separator 250 separates the P-picture RL3 into the right picture R3 and a left picture L3. Picture R3 contains an odd number of lines, while picture L3 contains an even number of lines. The first separator 250 outputs the right picture R3 to the first and second detectors 252 and 254, and the left picture L3, to the third and fourth detectors 256 and 258. The second separator 260 separates the I-picture RL1 into a right picture R1 containing an odd-numbered lines and a left picture L1 containing an even-numbered lines. The second separator 260 outputs the right picture R1 to the fifth and sixth detectors 262 and 264, and the left picture L1, to the seventh and eighth detectors 266 and 268. The 16×8 pixel output circuit 270 separates the current macroblock SMB to right and left picture halves of the 16×8 pixels. The right half macroblock R2B contains an odd number of lines, while the left half macroblock L2B contains an even number of lines, as shown in FIG. 23. The output circuit 270 outputs the macroblock R2B to the first, third, fifth and seventh detectors 252, 256, 262 and 266, and the macroblock L2B to the second, fourth, sixth and eighth detectors 254, 258, 264 and 268. The motion vectors are detected using right pictures R1 and R3, left pictures L1 and L3, and right and left macroblock halves, R2B and L2B.

Figure 24A:
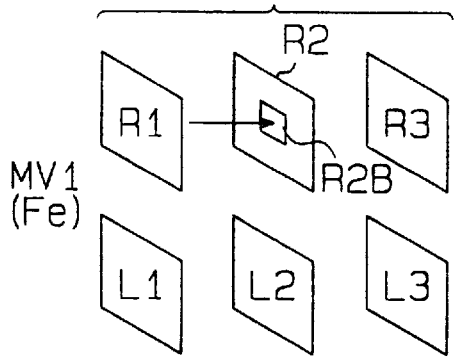
Figure 24B:
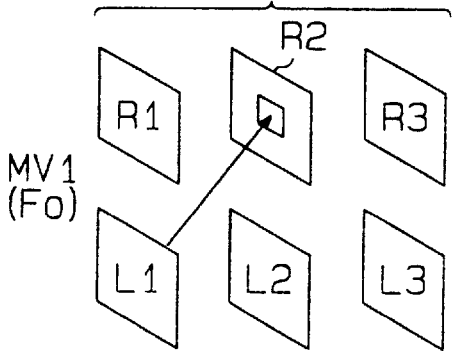
Figure 24C:
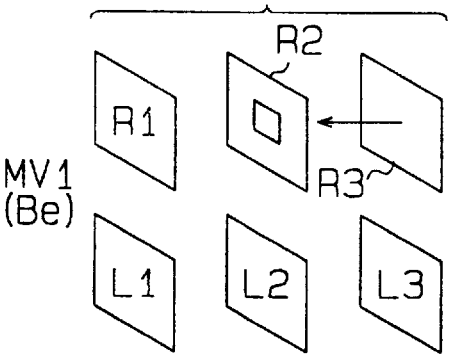
Figure 24D:
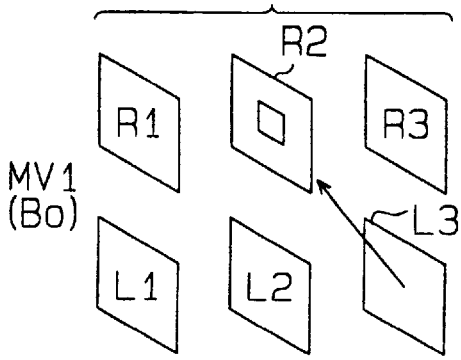
Figure 24E:
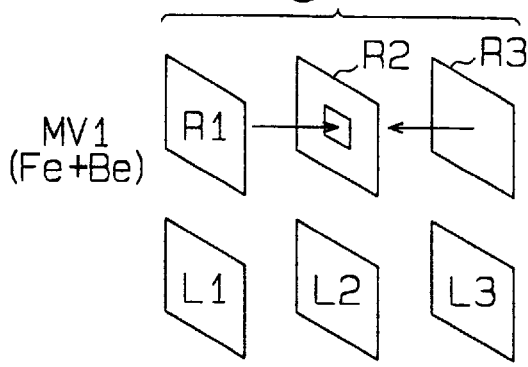
Figure 24F:
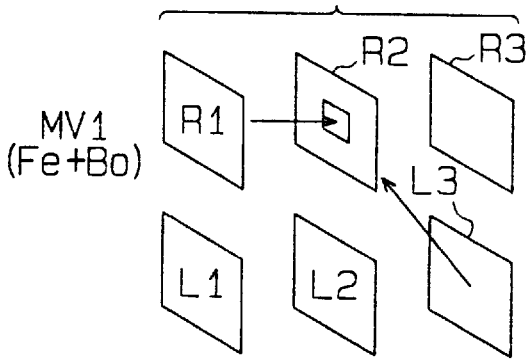
Figure 24G:
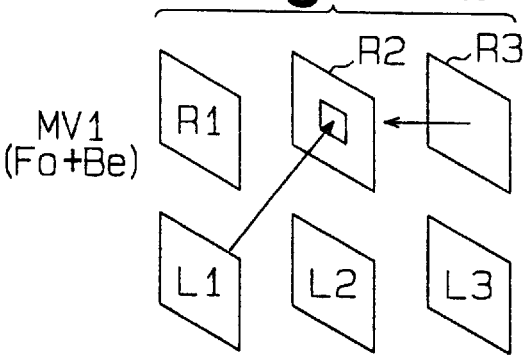
Figure 24H:
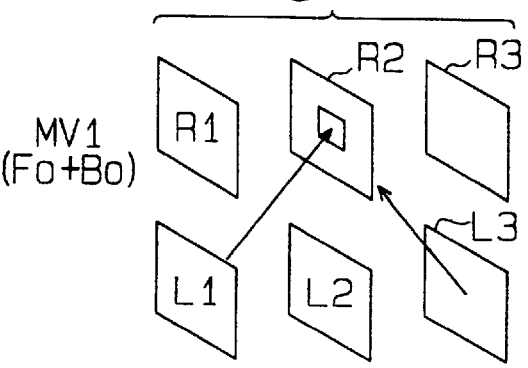

The first detector 252 detects the backward motion vector MV1(Be) from both the right picture R3 and the right half macroblock R2B, as shown in FIG. 24C. The third detector 256 detects the backward motion vector MV1(Bo) from both the left picture L3 and the right half macroblock R2B, as shown in FIG. 24D. The fifth detector 262 detects the forward motion vector MV1(Fe) from the right picture R1 and the right half macroblock R2B, as shown in FIG. 24A. The seventh detector 266 detects the forward motion vector MV1(Fo) from the left picture L1 and the right half macroblock R2B, as shown in FIG. 24B.

Figure 25A:
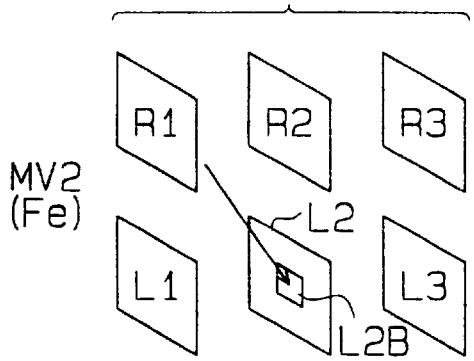
Figure 25B:
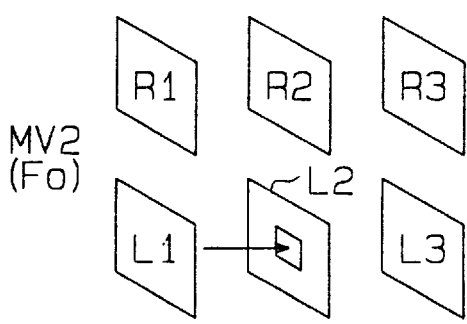
Figure 25C:
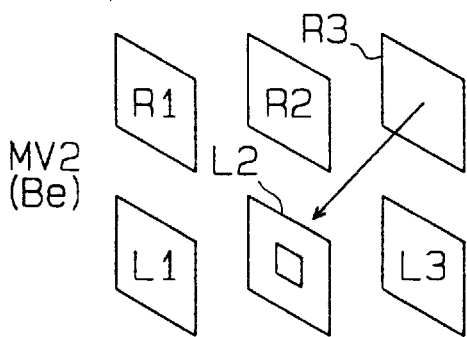
Figure 25D:
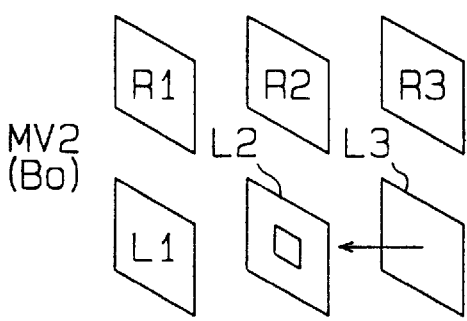
Figure 25E:
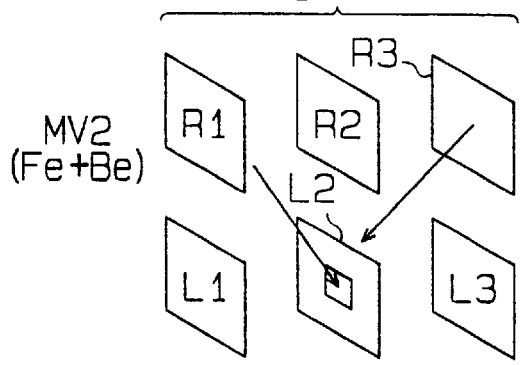
Figure 25F:
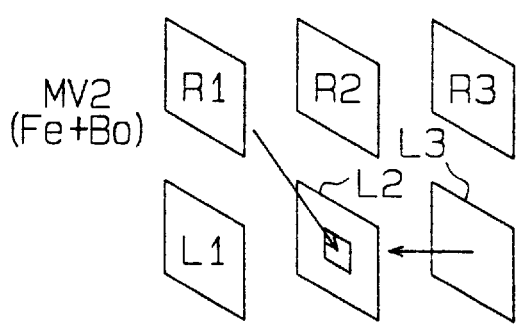
Figure 25G:
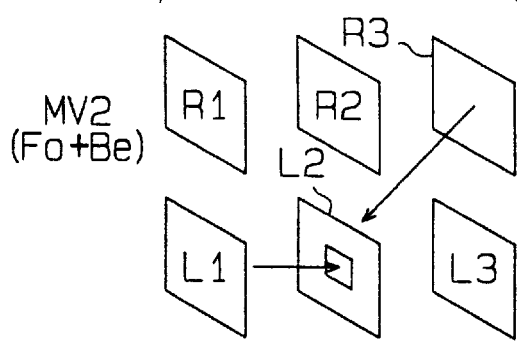
Figure 25H:
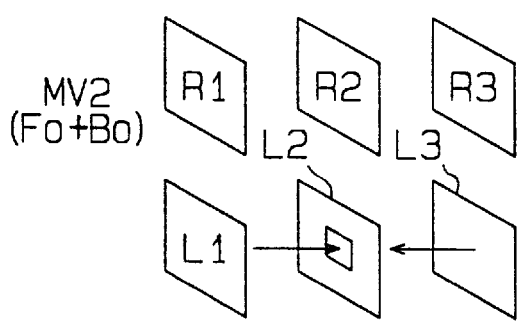

The second detector 254 detects the backward motion vector MV2(Be) from the left picture L2 and left half macroblock L2B, as shown in FIG. 25C. The fourth detector 258 detects the backward motion vector MV2(Bo) from both the left picture L3 and the left half macroblock L2B, as shown in FIG. 25D. The sixth detector 264 detects the forward motion vector MV2(Fe) from the right picture R1 and the left half macroblock L2B, as shown in FIG. 25A. The eighth detector 268 detects the forward motion vector MV2(Fo) from both the left picture L1 and the left half macroblock L2B, as shown in FIG. 25B.

The first motion vector generator 272 produces four types of bidirectional motion vectors MV1(Fe+Be, Fe+Bo, Fo+Be, Fo+Bo) from the four types of motion vectors MV1(Be, Bo, Fe, Fo) detected by the first, third, fifth and seventh detectors 252, 256, 258 and 266, as shown in FIGS. 24E to 24H.

The second motion vector generator 274 produces four types of bidirectional motion vectors MV2(Fe+Be), MV2(Fe+Bo), MV2(Fo+Be) and MV2(Fo+Bo). Each is respectively generated from the four types of motion vectors MV2(Be), MV2(Bo), MV2(Fe) and MV2(Fo). These four motion vectors are detected by the second, fourth, sixth and eighth detectors 254, 258, 264 and 268, as shown in FIGS. 25E to 25H. Consequently, the second circuit 242 outputs 16 types of inter-field prediction oriented motion vectors to the read controller 148 and the mode discriminator 152.

The read controller 148, based on the type of motion vector output from the first circuit 240, controls the output of 16×16 pixel macroblocks from the image memory 132. This control corresponds to one of three types of motion vectors output from the first circuit 240. The reference macroblocks are acquired from the I-picture RL1 and/or the P-picture RL3. The 16×16 pixel macroblocks are formed from the odd numbered lines of the right image (picture) and the even numbered lines of the left image (picture). The read controller 148 also controls the image memory 132 in such a way as to output 16×8 reference macroblocks halves. These halves correspond to the 16 types of motion vectors output from the second circuit 242 to the mode discriminator 152. As in the previous example, the reference macroblocks are acquired from the I-picture RL1 and/or the P-picture RL3. The 16×8 pixel macroblocks, however, are formed from all the lines of the right or left image (picture).

Encoding Mode Discrimination

The mode discriminator 152 has a first dispersion value detector 278, second to fourth dispersion value detectors 280, 284 and 288, and first to third subtractors 282, 286 and 290. The current macroblock is input to the first dispersion value detector 278. The second to fourth detectors and first to third subtractors correspond to the three types of reference macroblocks. The mode discriminator 152 further includes fifth and sixth dispersion value detectors 294 and 300, fourteen additional dispersion value detectors (unillustrated), a fourth and fifth subtractors 296 and 298, and an addition fourteen subtractors (unillustrated). The sixteen dispersion value detectors and subtractors correspond to the 16 types of reference half macroblocks. The mode discriminator 152 further has a 16×8 pixel output circuit 292, a dispersion value comparator 302 and a selector 276.

(1) Calculation of Dispersion Value in Inter-frame Prediction

The first dispersion value calculator 278 receives the current macroblock SMB from the macroblock converter 112 and computes a dispersion value indicating the compression efficiency of the macroblock SMB. The first subtractor 282 calculates the difference (i.e., the prediction error value) between the current macroblock SMB and the reference 16×16 pixel macroblock. The difference is indicated by motion vector MV(F). The second calculator 280 receives the difference from the first subtractor 282 and calculates a dispersion value which indicates the compression efficiency for forward inter-frame prediction. The second subtractor 286 calculates the difference between the current macroblock SMB and the reference macroblock. This difference corresponds to motion vector MV(F+B). The third calculator 284 receives the difference from the second subtractor 286, and calculates a dispersion value indicative of the compression efficiency for bidirectional inter-frame prediction. The third subtractor 290 calculates the difference between the current macroblock SMB and the reference macroblock corresponding to motion vector MV(B). The fourth calculator 284 receives the difference from the third subtractor 290 and calculates a dispersion value indicative of the compression efficiency for backward inter-frame prediction.

(2) Calculation of Dispersion Value for Inter-field Prediction

The 16×8 pixel output circuit 292 separates the current macroblock SMB into right and left 16×8 pixel macroblocks R2B and L2B. The right half macroblock R2B contains odd numbers of lines and the left half macroblock L2B contains even numbers of lines, as shown in FIG. 23. The output circuit 292 outputs the right half macroblock R2B to eight subtractors (not shown) plus the fourth subtractor 296. The output circuit similarly outputs the left half macroblock L2B to another eight subtractors (not shown) plus the fifth subtractor 298. The fourth subtractor 296 calculates the difference between the right half macroblock R2B and the reference half macroblock. This difference corresponds to the motion vector MV1(Fe), as shown in FIG. 24A. The fifth calculator 294 receives the difference from the fourth subtractor 296 and calculates a dispersion value indicative of the compression efficiency of the right picture with forward inter-field prediction. Likewise, the unillustrated seven subtractors calculate the dispersion values, i.e., the differences between the right half macroblock R2B and each of the reference half macroblock that correspond to individual motion vectors MV1(Fo, Be, Bo, Fe+Be, Fe+Bo, Fo+Be, Fo+Bo), as shown in FIGS. 24B to 24H. The fifth subtractor 298 calculates the difference between the left half macroblock L2B and the reference half macroblock that corresponds to the motion vector MV2(Fe), as shown in FIG. 25A. The sixth calculator 294 takes the difference from the fifth subtractor 298 and calculates a dispersion value indicative of the compression efficiency of the left picture using forward inter-field prediction. These seven subtractors also calculate dispersion values, i.e., the differences between the left half macroblock L2B and each of the reference half macroblock. The seven dispersion values correspond to the individual motion vectors MV2(Fo, Be, Bo, Fe+Be, Fe+Bo, Fo+Be, Fo+Bo), as shown in FIGS. 25B to 25H.

(3) Determination of Optimal Encoding Mode

The dispersion value comparator 302 compares the individual dispersion values output from the first to sixth calculators 278, 280, 284, 288, 294, 300 and from the unillustrated calculator 14 to identify the macroblock having the smallest value, and outputs macroblock information MBT. MBT information represents type of macroblock minimizing dispersion value, according to any one of seven codings; intra mode coding (i.e., intra-frame coding without motion vectors) and six types of inter mode codings. As shown in Table 1, the six types of inter modes include:

i) Inter-frame predictive encoding using the forward motion vector MV(F), ii) Inter-frame predictive encoding using the backward motion vector MV(B), iii) Inter-frame predictive encoding using the bidirectional motion vector MV(F+B), iv) Inter-field predictive encoding using a pair of forward motion vectors MV1 and MV2 included in a first group 1, v) Inter-field predictive encoding using a pair of backward motion vectors MV1 and MV2 included in a second group 2, vi) Inter-field predictive encoding using a pair of bidirectional motion vectors MV1 and MV2 included in a third group 3.

The selector 276 outputs a motion vector to the read controller 148 and the inserter 121 depending on the type of inter-frame motion vectors MV(F, B, F+B), the inter-field motion vectors and on MBT inter mode data. The selector 276 selectively outputs the associated motion vector to the read controller 148 and the inserter 121.

In the third example, as described above, it is possible to selectively perform two types of motion compensation during predictive encoding of the merged right and left image. The first type is motion compensation based on the inter-frame prediction using the merged right and left image RL1, with or without RL3, and on the 16×16 pixel macroblock SMB. The second type is the motion compensation based on the inter-field prediction using the right and left pictures R1, R3, L1 and L3, and on the right and left half macroblocks R2B and L2B, i.e., parallax compensation. This parallax compensation scheme enhances the efficiency of encoding a two-dimensional merged image irrespective of whether the image has a high or low degree of correlation between the right and left image segments. Furthermore, use of the frame/field block converter 145 allows for increased DCT processing efficiency based on the dispersion values of the merged right and left macroblock and of the separate right and left macroblock halves.

Fourth Example of First Embodiment

Figure 26:
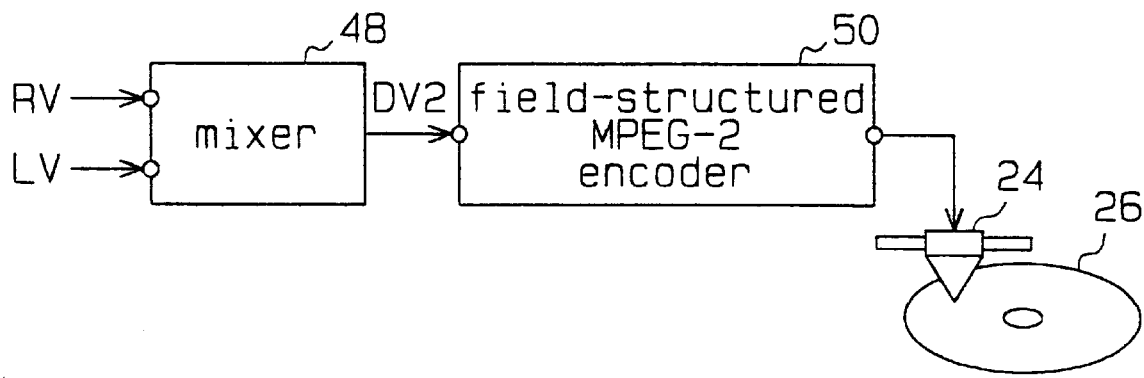
Figure 27:
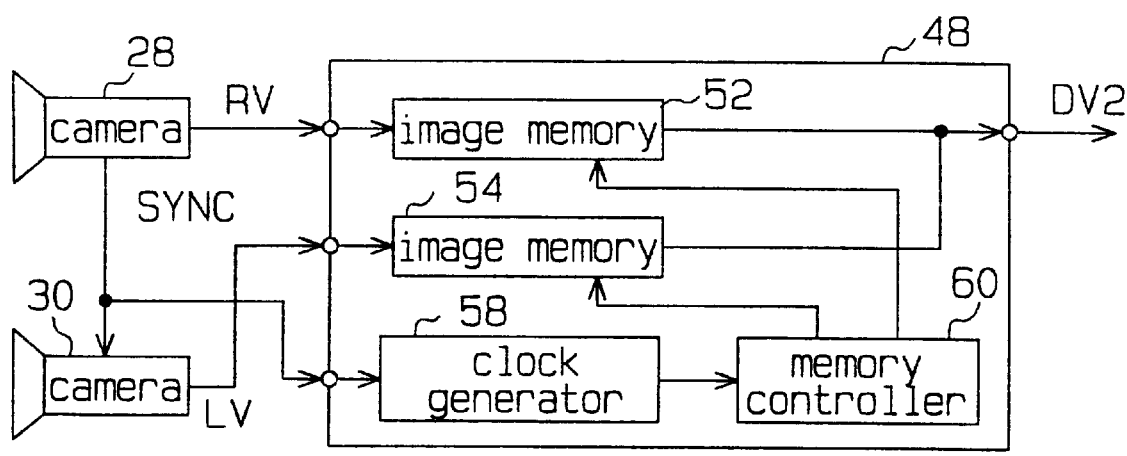
Figure 28:
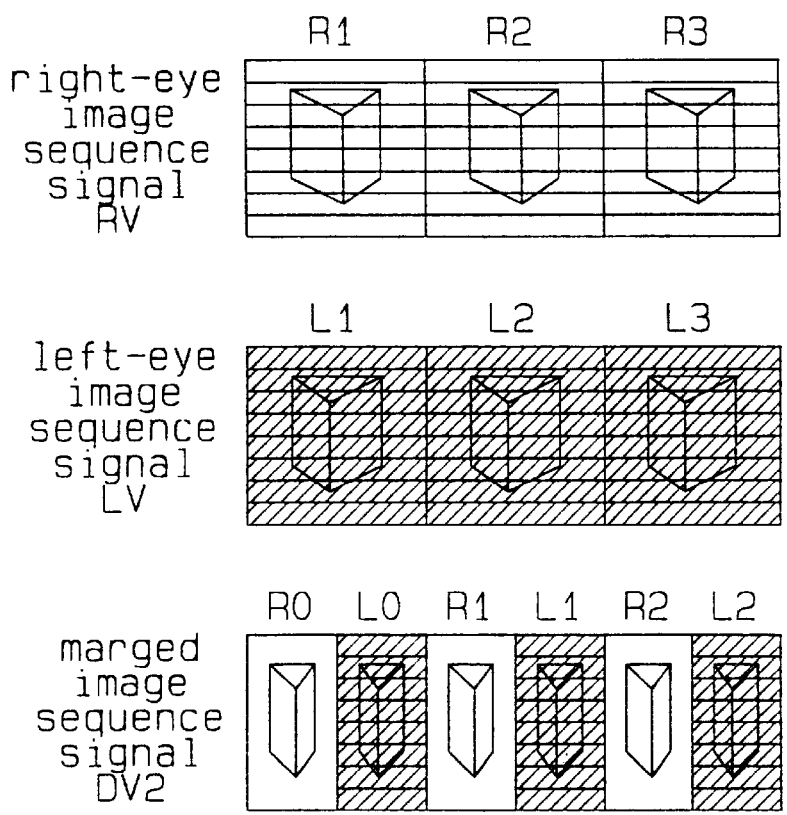

A fourth example of the first embodiment will now be described with reference to FIGS. 26 to 35. As shown in FIG. 26, a 3D image sequence encoding apparatus, setup in a field structure mode, includes a mixer 48 and an MPEG-2 compliant encoder 50. The mixer 48 includes a first image memory 52 that stores the right-eye image signal RV sensed by the first camera 28, and a second image memory 54 that stores the left-eye image signal LV sensed by the second camera 30. An illustration of images RV and LV is shown in FIG. 28. The mixer 48 also includes a clock generator 58 and a memory controller 60. In synchronism with the sync signal SYNC output from the first camera 28, the clock generator 58 generates a clock signal and outputs it to the memory controller 60. In synchronism with the clock signal, the memory controller 60 outputs the write signal to the first and second image memories 52 and 54. These image memories, in turn, store the right and left image sequence, frame by frame (i.e., picture by picture), for a predetermined cycle (1/30 sec. for example) in response to the write signal. In synchronism with the clock signal, the memory controller 60 produces a first read signal at a frequency twice that of the clock signal. The controller 60 also produces a second read signal with a delay based on the first read signal. The second read signal, like the first, is produced at twice the frequency of the clock signal. The right image sequence is read from the first image memory 52, frame by frame, over a predetermined period (1/60 sec., for example) in response to the first read signal. The left image sequence is read from the second image memory 54, frame by frame, but is delayed from the right image sequence in response to the second read signal. When the right and left image sequences are read from the image memories 52 and 54, the mixer 48 outputs the right-and-left merged image sequence signal DV2 to the encoder 50, as shown in FIG. 28.

Figure 29:
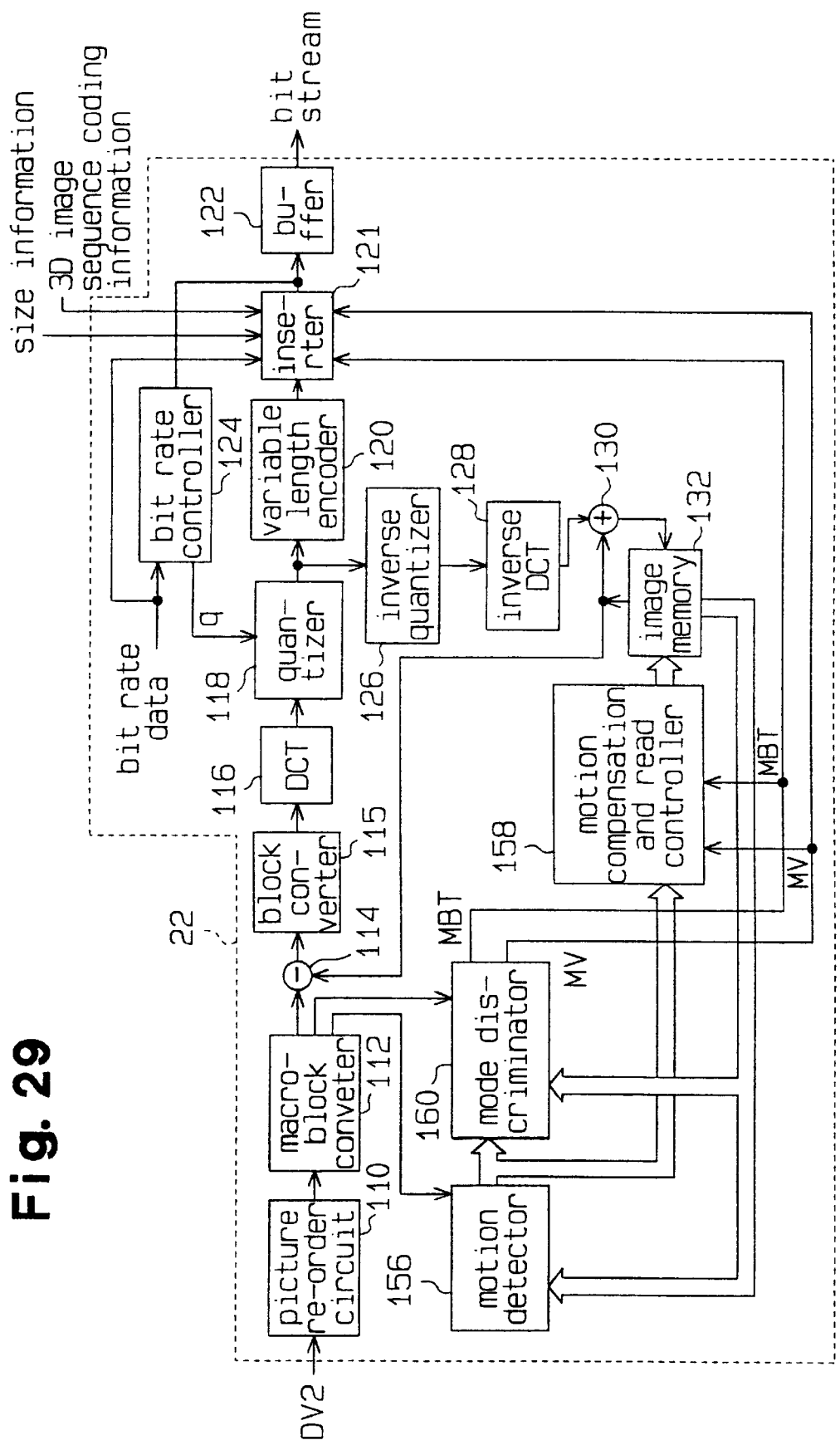
Figure 30:
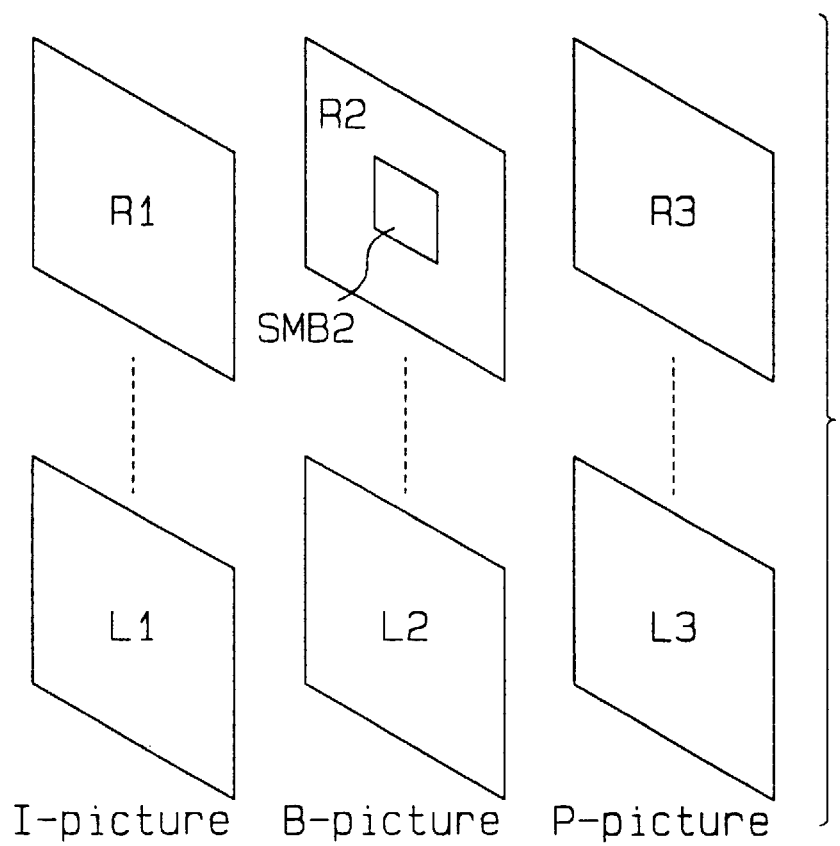

FIG. 29 presents a block circuit diagram of the MPEG-2 compliant encoder 50. For purposes of clarity, the same reference numerals used in the first example will be used for the same components of encoder in this example. Moreover, it will be assumed that the image memory 132 stores a decoded I-picture including both the left and right field images L1, R1, and a decoded P-picture including both the left and right field images L3, R3, according to the field structure shown in FIG. 30. It is further assumed that the macroblock converter 112 outputs the macroblock SMB2, in the right field image R2, to both the motion detector 150 and the mode discriminator 152. The right field image R2 is located between the right field images R1 and R2. Finally, the following correspondences will be assumed for the right field images: image R1 corresponds to the I-picture, image R2 corresponds to the B-picture, and image R3 corresponds to the P-picture.

Motion Detection

Figure 31:
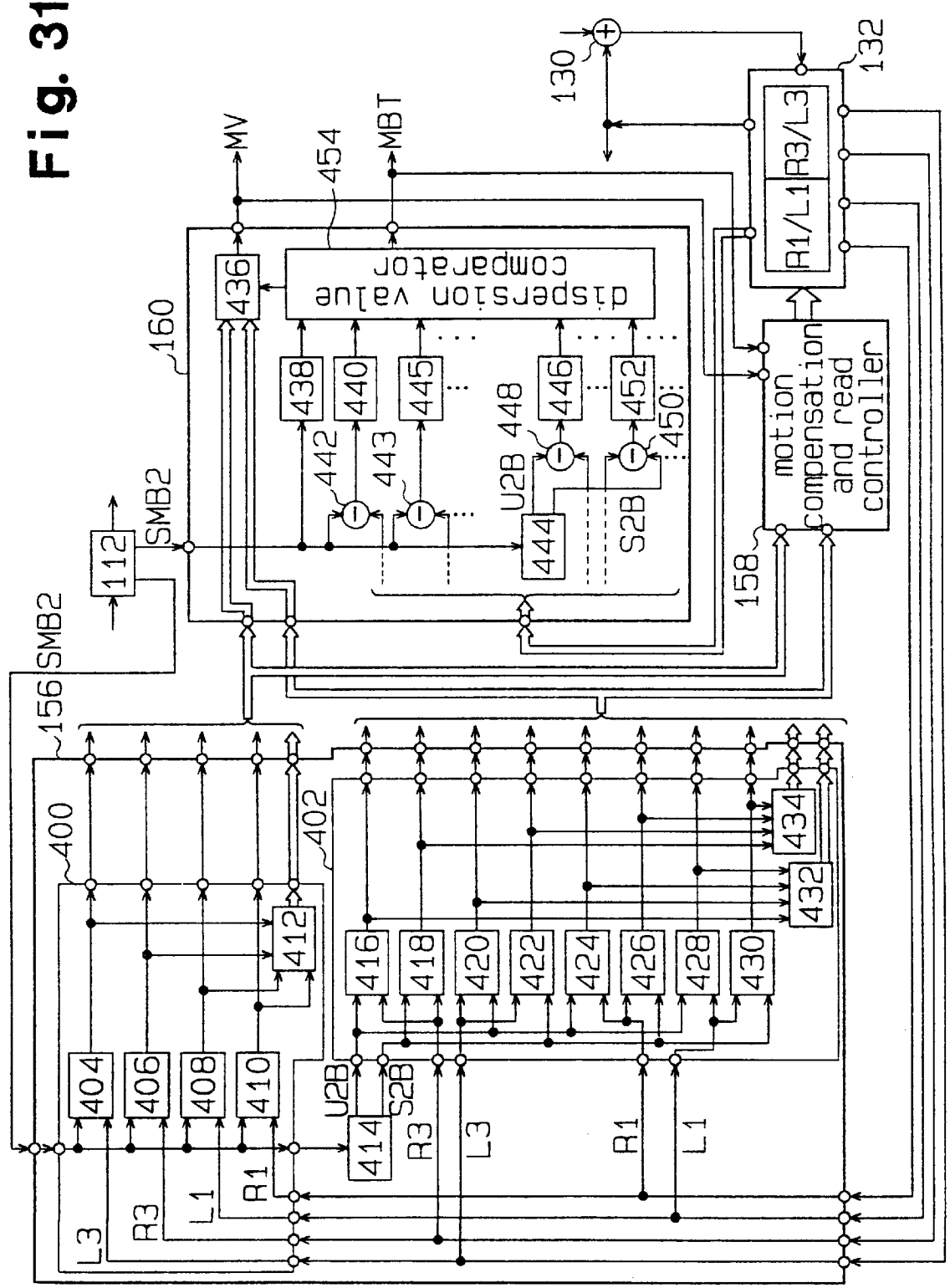

As shown in FIG. 31, the motion detector 150 includes first and second circuit 400, 402 and a separator 414. The first circuit 400 detects and produces an inter-field prediction oriented motion vector using a 16×16 pixel macroblock. The second circuit 402 detects and produces an inter-field prediction oriented motion vector using 16×8 macroblock halves.

(1) Detection of Motion Vectors Based on 16×16 Inter-Field Prediction

Figure 32A:
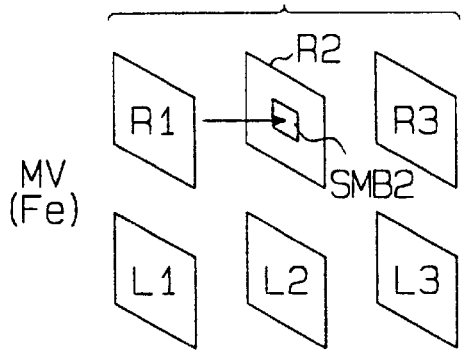
FIGS. 32A through 32H are diagrams explaining field prediction using a macroblock of 16×16 pixels.
Figure 32B:
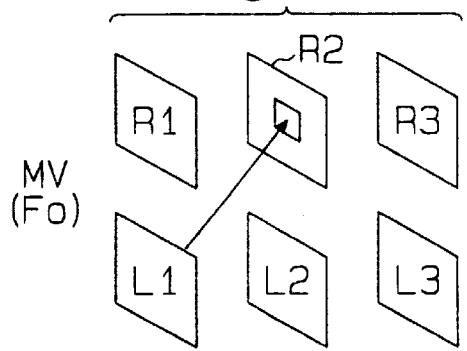
Figure 32C:
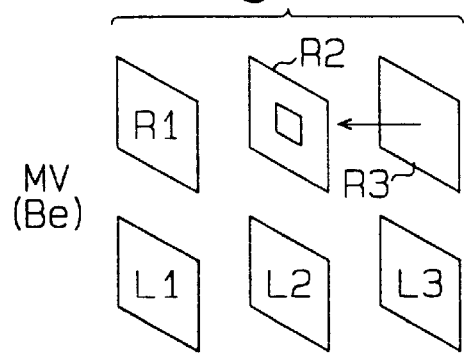
Figure 32D:
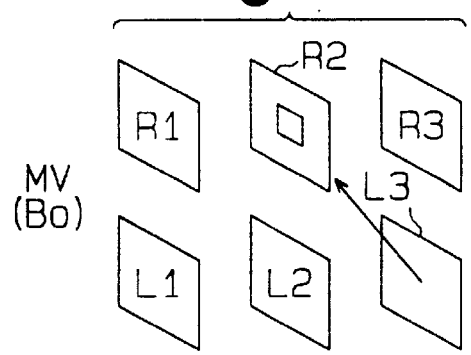
Figure 32E:
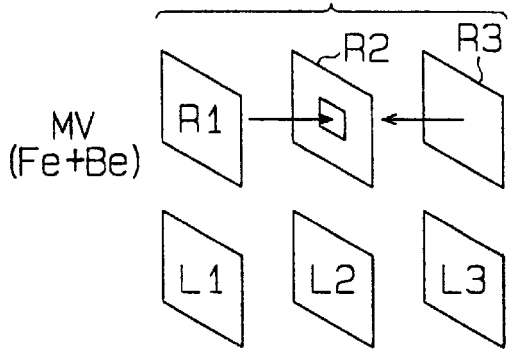
Figure 32F:
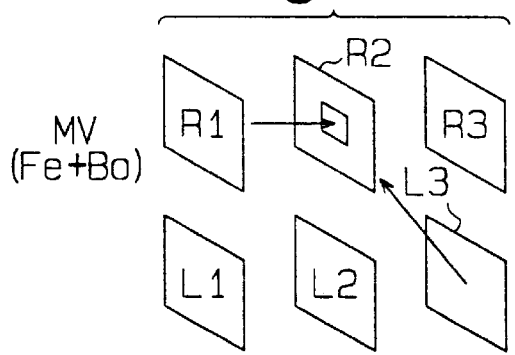
Figure 32G:
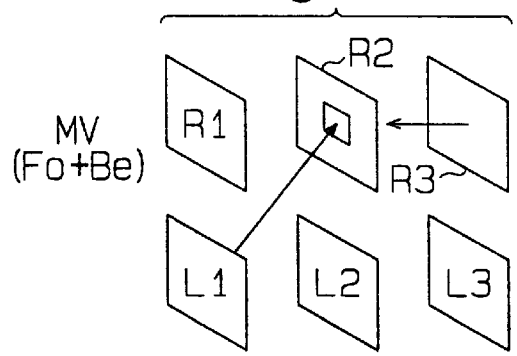
Figure 32H:
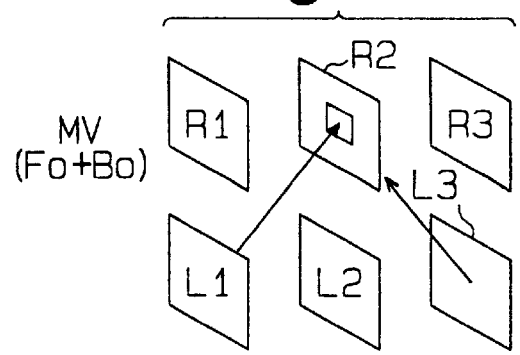

The first circuit 400 has four motion vector detectors 404, 406, 408 and 410, and a motion vector generator 412. The first detector 404 searches the P-field L3, output from the image memory 132, for the reference macroblock most similar to the current 16×16 pixel macroblock SMB2 output from the macroblock converter 112. As shown in FIG. 32D, the first detector 404 detects the backward motion vector MV(Bo), which indicates the position of the reference macroblock. Likewise, the second detector 406 detects the backward motion vector MV(Be), shown in FIG. 32C, from both the current macroblock SMB2 and the right P-field R3. The third detector 408 detects the forward motion vector MV(Fo), shown in FIG. 32B, from both the current macroblock SMB2 and the left I-field L1. The fourth detector 410 detects the forward motion vector MV(Fe), shown in FIG. 32A, from the current macroblock SMB2 and right I-field R1. The motion vector generator 412 produces four types of bidirectional motion vectors Fe+Be, Fe+Bo, Fo+Be, Fo+Bo from the respective motion vectors MVFe, MVFo, MVBe and MVBo shown in FIGS. 32E, 32F, 32G, and 32H. The first circuit 400 detects eight types of motion vectors by using the 16×16 pixel reference macroblock SMB2 and the combination of the four field images. The detected motion vectors are supplied to the read controller 158 and the mode discriminator 160.

(2) Detection of Motion Vectors Based on 16×8 Inter-Field Prediction

Figure 35:
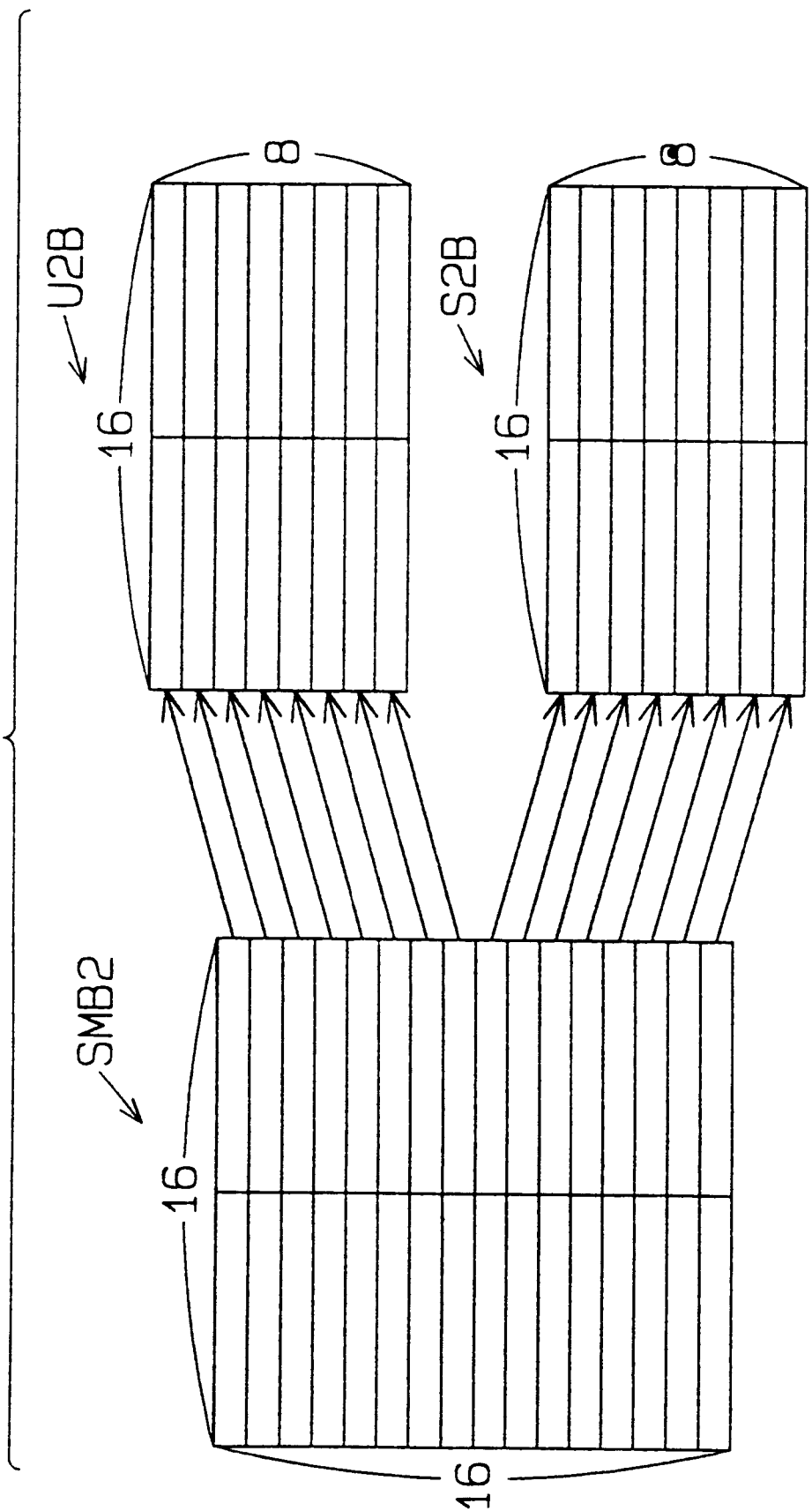

The second circuit 402 shown in FIG. 31 has a separator 414, first and second motion vector detectors 416 and 418 to which right P-field R3 is input, third and fourth motion vector detectors 420 and 422 to which the left P-field L3 is input, fifth and sixth motion vector detectors 424 and 426 to which the right I-field R1 is input, seventh and eighth motion vector detectors 428 and 430 to which the left I-field L1 is input, and first and second motion vector generators 432 and 434. The separator 414 receives the current macroblock SMB and separates it into an upper 16×8 pixel macroblock U2B and an lower 16×8 pixel macroblock S2B as shown in FIG. 35. The separator 414 outputs the upper macroblock U2B to the first, third, fifth and seventh detectors 416, 420, 424 and 428. The lower macroblock S2B is output to the second, fourth, sixth and eighth detectors 418, 422, 426 and 430.

Figure 33A:
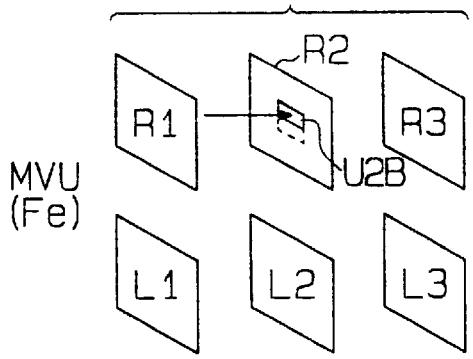
FIGS. 33A through 33H are diagrams explaining field prediction using an upper portion of a macroblock containing 16×8 pixels.
Figure 33B:
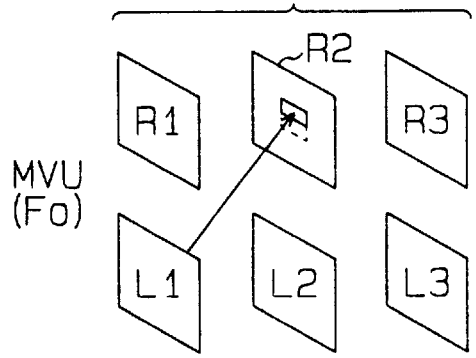
Figure 33C:
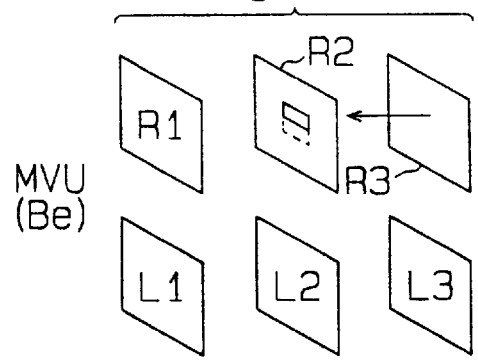
Figure 33D:
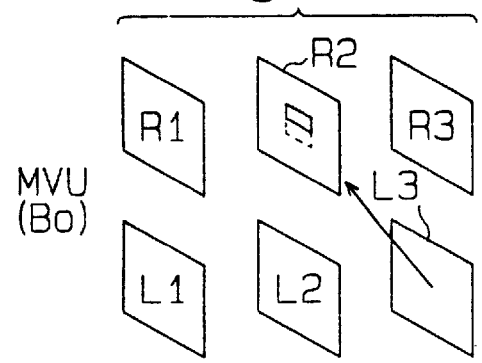
Figure 33E:
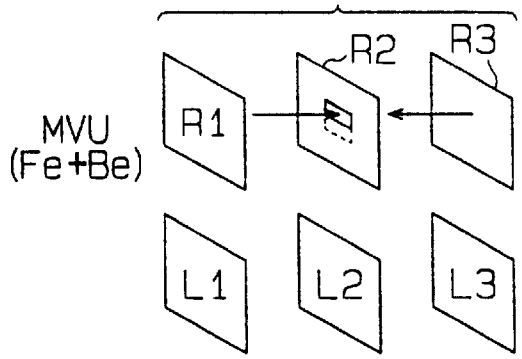
Figure 33F:
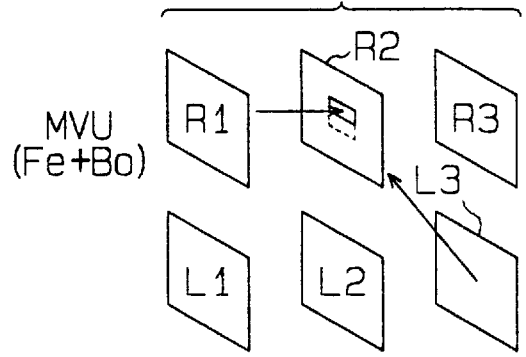
Figure 33G:
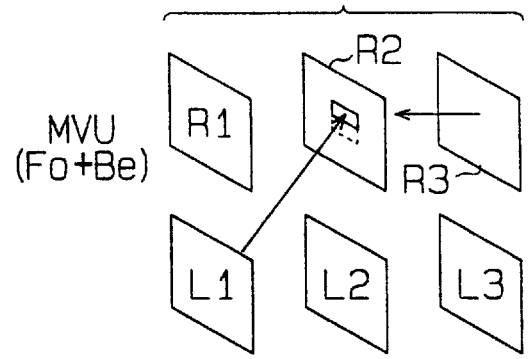
Figure 33H:
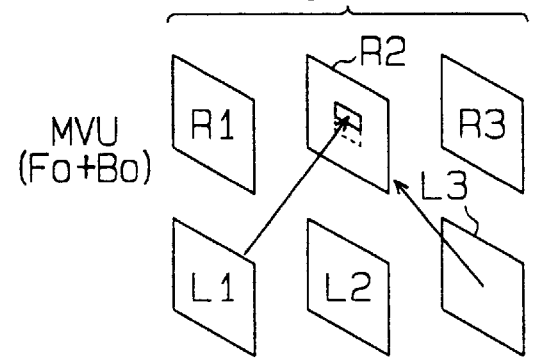

The first detector 416 detects the backward motion vector MVU(Be), shown in FIG. 33A, from the upper macroblock U2B and right P-field R3. The third detector 420 detects the backward motion vector MVU(Bo), shown in FIG. 33D, from the upper macroblock U2B and left P-field L3. The fifth detector 424 detects the forward motion vector MVU(Fe), shown in FIG. 33A, from the upper macroblock U2B and right I-field R1. The seventh detector 428 detects the forward motion vector MVU(Fo), shown in FIG. 33B, from the upper macroblock U2B and left I-field L1.

Figure 34A:
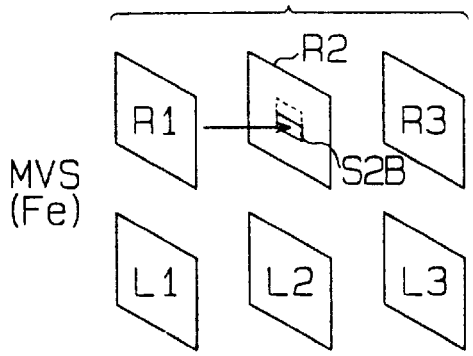
FIGS. 34A through 34H are diagrams explaining field prediction using an lower portion of a macroblock containing 16×8 pixels.
Figure 34E:
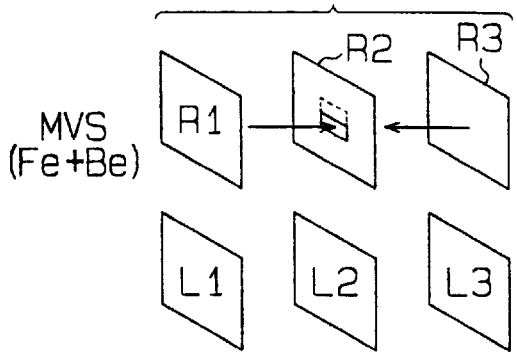
Figure 34B:
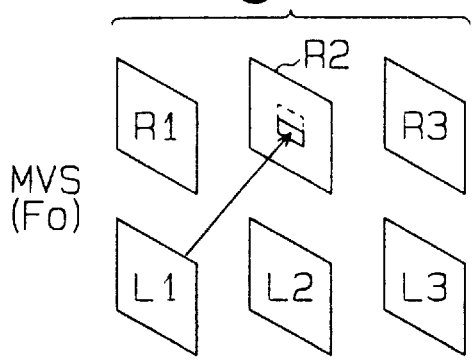
Figure 34F:
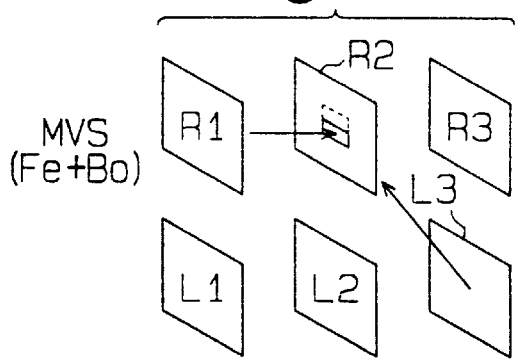
Figure 34C:
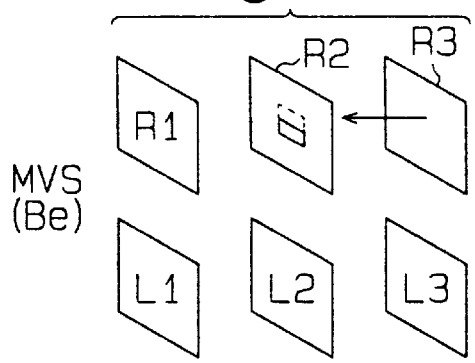
Figure 34G:
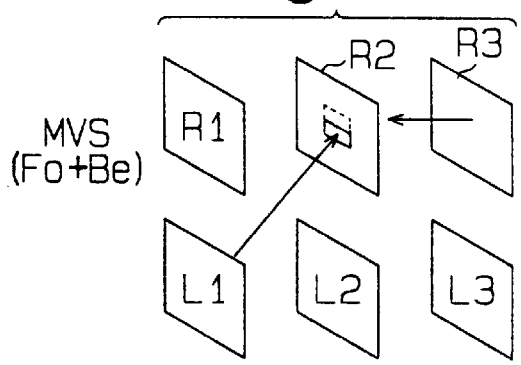
Figure 34D:
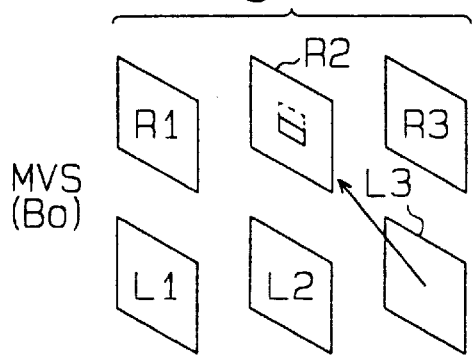
Figure 34H:
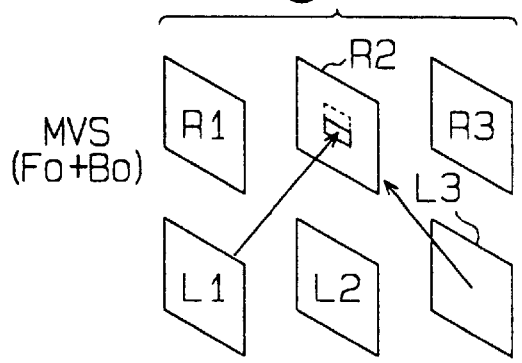

The second detector 418 detects the backward motion vector MVS(Be), shown in FIG. 34c, from the lower macroblock S2B and right P-field R3. The fourth detector 422 detects the backward motion vector MVS(Bo), shown in FIG. 34D, from the under macroblock S2B and left P-field L3. The sixth detector 426 detects the forward motion vector MVS(Fe), shown in FIG. 34A, from the under macroblock S2B and right I-field R1. The eighth detector 430 detects the forward motion vector MVS(Fo), shown in FIG. 34B, from the under macroblock S2B and left I-field L1.

The first motion vector generator 432 produces four types of bidirectional motion vectors MVU(Fe+Be), MVU(Fe+Bo), MVU(Fo+Be) and MVU(Fo+Bo) respectively from the motion vectors MVU(Be), MVU(Bo), MVU(Fe) and MVU(Fo), as illustrated in FIGS. 33E to 33H. The latter motion vectors are detected by the first, third, fifth and seventh detectors 416, 420, 424 and 428.

The second motion vector generator 434 produces four types of bidirectional motion vectors MVS(Fe+Be), MVS(Fe+Bo), MVS(Fo+Be) and MVS(Fo+Bo) from the respective motion vectors MVS(Be), MVS(Bo), MVS(Fe) and MVS(Fo), as shown in FIGS. 34E to 34H. The four MVS motion vectors are detected by the second, fourth, sixth and eighth detectors 418, 422, 426 and 430. This allows the second circuit 402 to output 16 types of motion vectors from the upper and lower 16×8 pixel macroblocks U2B and S2B and from the four fields R1, R3, L1 and L3. This output from the second circuit 402 is provided to the read controller 148 and the mode discriminator 152.

The read controller 158 controls the image memory 132 in such a way as to output 16×16 pixel reference macroblocks in accordance with the 8 types of motion vectors supplied from the first circuit 400 to the mode discriminator 160. The read controller 148 controls the image memory 132 to output 16×8 pixel reference macroblock halves in accordance with the 16 types of the motion vectors output from the second circuit 402.

Encoding Mode Discrimination

The mode discriminator 160 has three types of dispersion value detectors and two types of subtractors. A first dispersion value detector 438 corresponds to the current macroblock SMB2. A second type of dispersion value detector and a first type of subtractor corresponds to the eight motion vectors produced by the first circuit 400. A third type of dispersion value detector and a second type of subtractor correspond to the sixteen motion vectors produced by the second circuit 402. FIG. 31 illustrates two of eight dispersion value detectors 440, 445 that correspond to the eight motion vectors produced by the first circuit 400, and two of 16 detectors 446, 452 that correspond to the sixteen motion vectors produced by second circuit 402.

FIG. 31, likewise, illustrates two of eight subtractors 442, 443 that correspond to the eight motion vectors produced by circuit 400 and two of sixteen subtractors 448, 450 that correspond to the sixteen motion vectors produced by circuit 402.

(1) Calculation of Dispersion Values Based on 16×16 Inter-Field Prediction

The first calculator 438 calculates a dispersion value indicative of the compression efficiency of the current macroblock SMB2. The second calculator 440 calculates the dispersion value indicative of the difference between the current macroblock SMB2 and the 16×16 pixel reference macroblock corresponding to the forward motion vector MV(Fe). The third calculator 445 calculates a dispersion value indicative of the difference between the current macroblock SMB2 and the reference macroblock corresponding to the forward motion vector MV(Fo). Likewise, the six unillustrated calculators respectively calculate the dispersion values of the differences from the six unillustrated subtractors with respect to the backward motion vectors MV(Be), MV(Bo) and the bidirectional predictive vectors MV(Fe+Be), MV(Fe+Bo), MV(Fo+Be) and MV(Fo+Bo). The first and second subtractors 442 and 443 provide difference values between the current and reference macroblocks to the dispersion value calculators 440 and 445 respectively.

(2) Calculation of Dispersion Values Based on 16×8 Inter-Field Prediction

The separator 444 separates the current macroblock SMB2 into the upper macroblock U2B and lower macroblock S2B. It then outputs the macroblock U2B to the eight subtractors, including the subtractor 448. The separator 444 outputs the macroblock S2B to the eight subtractors including the fourth subtractor 452, as shown in FIG. 35. The fourth calculator 446 calculates the dispersion value indicative of the difference between the upper macroblock U2B and the 16×16 pixel reference macroblock halve corresponding to the forward motion vector MVU(Fe). The subtractor 446 provides the difference between the two macroblocks to the fourth calculator 446. Likewise, the seven unillustrated calculators produce dispersion values indicative of the differences between the seven unillustrated subtractors corresponding to the backward motion vectors MVU(Fo, Be, Bo), and to the bidirectional predictive vectors MVU (Fe+Be, Fe+Bo, Fo+Be, Fo+Bo). The fifth calculator 452 calculates the dispersion value indicative of the difference between the under macroblock S2B and the 16×8 reference macroblock halve corresponding to the forward motion vector MVS(Fe), calculated by the fourth subtractor 450. The seven unillustrated calculators respectively calculate the dispersion values indicative of the differences between the seven unillustrated subtractors corresponding to the backward motion vectors MVS(Fo, Be, Bo), and the bidirectional motion vectors MVS(Fe+Be, Fe+Bo, Fo+Be, Fo+Bo).

(3) Determination of Optimal Encoding Mode

The dispersion value comparator 454 compares the individual dispersion values output from the first to fifth calculators 438, 440, 445, 446 and 452 (and the unillustrated 20 calculators) to identify the macroblock having the smallest value. The comparator then outputs that MBT information to the selector 436 and the inserter 121. MBT information represents the type of macroblock minimizing dispersion value, according to any one of seven codings; the intra mode coding and six types of inter mode codings. As shown in Table 2, the six types of inter modes include:

i) Inter-field predictive encoding using any forward motion vector MV(Fe, Fo), ii) Inter-field predictive encoding using any backward motion vector MV(Be, Bo), iii) Inter-field predictive encoding using the bidirectional motion vector MV(Fe+Be, Fe+Bo, Fo+Be, Fo+Bo), iv) Inter-field predictive encoding using a pair of the forward motion vectors MVU and MVS included in a group 1, v) Inter-field predictive encoding using a pair of the backward motion vectors MVU and MVS included in a group 2, vi) Inter-field predictive encoding using a pair of the bidirectional motion vectors MVU and MVS included in a group 3. In response to any of the 24 types of inter-field prediction oriented motion vectors output from the motion detectors 156, and to MBT data, the selector 436 selectively outputs the associated motion vector to the read controller 158 and the inserter 121.

In the fourth example, as described above, it is possible to selectively perform three types of motion compensation during predictive encoding of a merged left and right image. The first type is motion compensation based on the inter-field prediction using, for example, two right pictures R1 and R3 and the right 16×16 pixel macroblock SMB2 (or upper and lower 16×16 pixel macroblocks U2B and S2B). The second type is motion compensation based on the inter-field prediction using, for example, two left pictures L1 and L3 and the right 16×16 pixel macroblock SMB2 (or the upper and lower 16×8 pixel macroblocks U2B and S2B), i.e., by parallax compensation. The third type of motion compensation is intermediate (or interpolative) compensation between the first motion compensation and the second, parallax compensation. It is therefore possible to select a macroblock type with the highest compression efficiency in depending on the correlation between the right and left pictures. Further, use of the upper and lower 16×8 pixel macroblocks U2B and S2B ensures a higher density of predictive encoding compared with the use of the current 16×16 macroblock SMB2.

Although only three embodiments and four examples of the present invention have been described herein, it should be apparent to those skilled in the art that the present invention may be embodied in many other specific forms without departing from the spirit or scope of the invention. Particularly, it should be understood that this invention may be embodied in the following forms.

Figure 36:
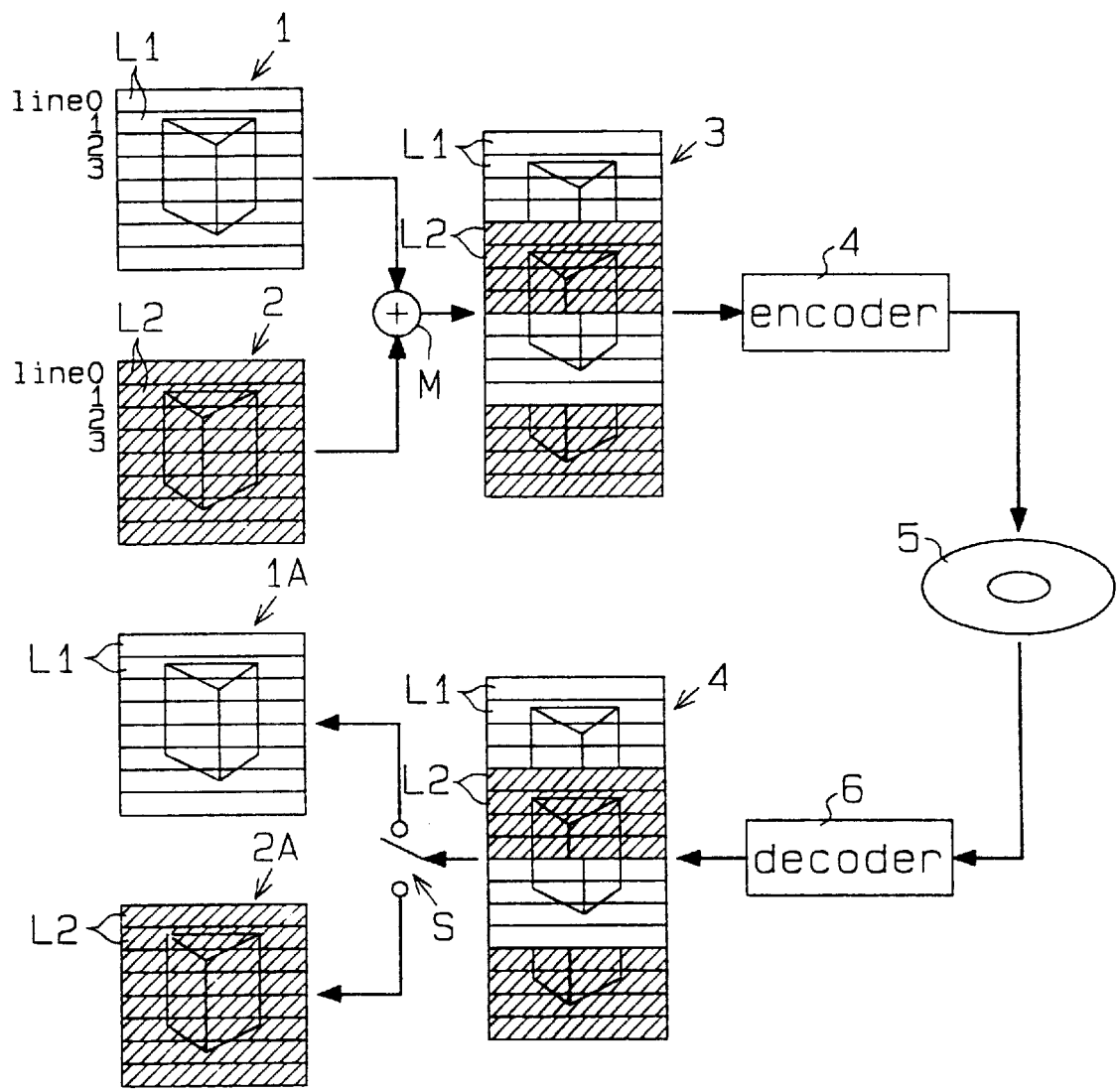
FIG. 36 is a diagram showing the encoding and decoding of a sequence of 3D images according to another embodiment of this invention.

As shown in FIG. 36, lines L1 of the left picture 1 and lines L2 of the right picture 2 may be merged in alternating fashion fora particular number of lines (four lines in this case).

Figure 37:
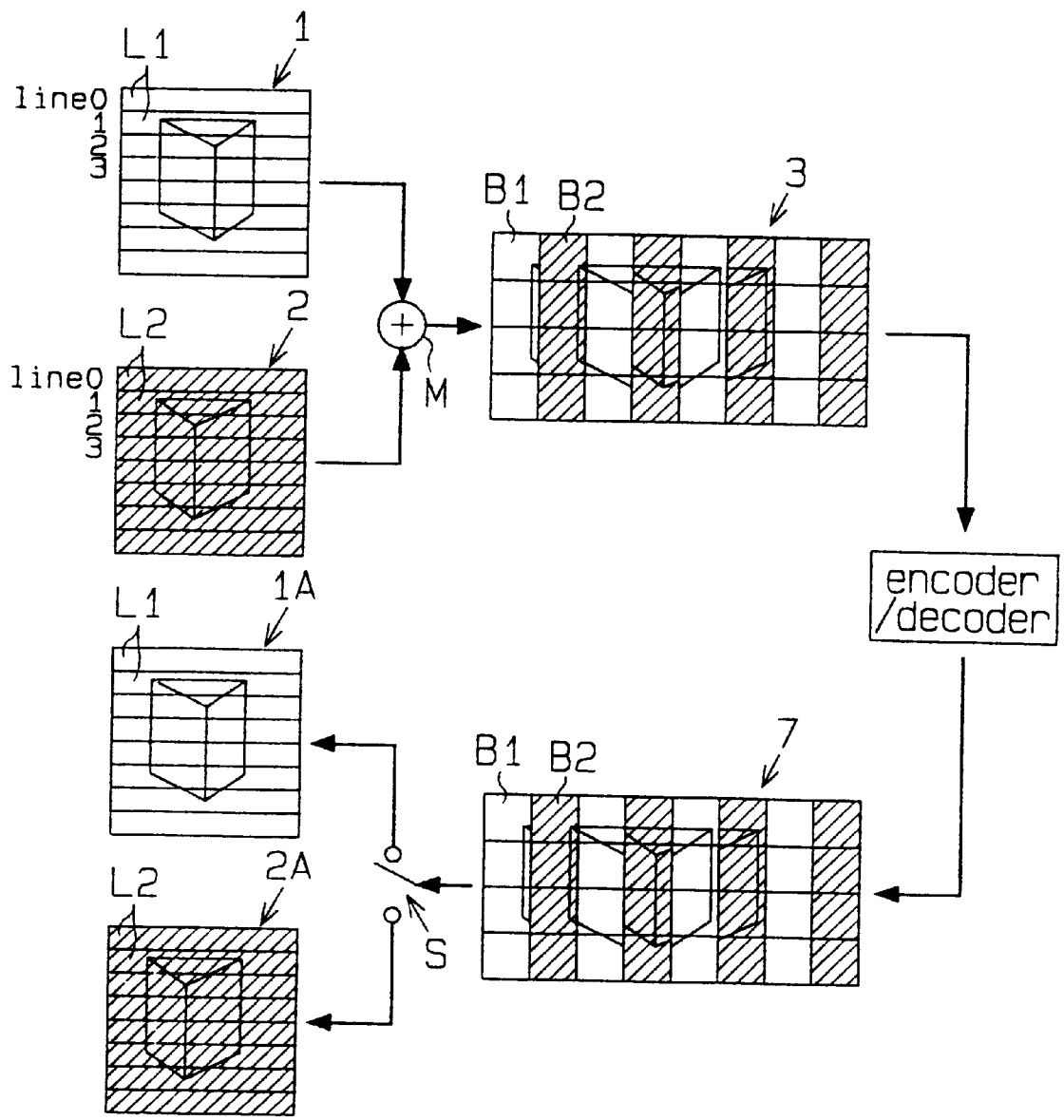
FIG. 37 is a diagram showing the encoding and decoding of a sequence of 3D images according to a yet another embodiment of this invention.

As shown in FIG. 37, the left picture 1 and the right picture 2 may be merged in alternating fashion for each of the blocks B1 or B2. Preferably the left picture 1 and the right picture 2 are non-interlaced for easier block separation.

The magneto-optical disk as a medium for recording encoded data may be replaced with other recording media, such as an optical disk, a phase transition type disk or a hard disk.

Therefore, the present examples and embodiments are to be considered as illustrative and not restrictive and the invention is not to be limited to the details given herein, but may be modified within the scope of the appended claims.

What is claimed is:

1. A method of encoding a signal with a three dimensional image sequence using left and right video image sequences, each of the left video images being a picture, each of the right video images being a picture, said method comprising the steps of:

merging each of said right pictures with a left picture continuously to produce a plurality of merged pictures, each of merged pictures containing a right field corresponding to a right picture and a left field corresponding to a left picture;

encoding a first merged picture, selected from said plurality of merged pictures, to produce an I-picture;

predictively encoding a second merged picture, selected from said plurality of merged pictures, by using the right and left fields of said first merged picture to produce a P-picture; and predictively encoding a third merged picture, selected from said plurality of merged pictures and located between said first merged picture and said second merged picture, by using the fields of at least one of said first and second merged pictures to produce a B-picture, wherein each of said predictively encoding steps for the P-picture and B-picture comprises the steps of:

separating left and right fields of the corresponding merged picture into a plurality of left and right 16×16 pixel macroblocks, respectively;

calculating a first value indicative of the predictive encoding efficiency performed on each of said left and right 16×16 macroblocks, by using a target 16×16 left or right macroblock and one or more same left or right fields of said first and second merged pictures;

calculating a second value indicative of the predictive encoding efficiency performed on each of said left and right 16×16 macroblocks, by using a target 16×16 left or right macroblock and one or more opposite left or right fields of said first and second merged pictures;

separating each of said left 16×16 pixel macroblocks into a left upper and a left lower 16×8 macroblock, and separating each of said right 16×16 pixel macroblocks into a right upper and a right lower 16×8 macroblock;

calculating a third value indicative of the predictive encoding efficiency performed on each of said left and right 16×16 macroblocks by using a target 16×8 left or right macroblock and one or more same left or right fields of said first and second merged pictures;

calculating a fourth value indicative of the predictive encoding efficiency performed on each of said left and right 16×16 macroblocks by using a target 16×8 left or right macroblock and one or more opposite left or right fields of said first and second merged pictures;

selecting the most efficient predictive encoding process between said first to fourth values; and predictively encoding the corresponding merged picture to produce the P-picture or B-picture, based on the most efficient of the predictive encoding processes.

2. The method according to claim 1, wherein said left picture includes two fields, each of which is constituted by the left line images obtained by interlaced scanning, and wherein said right picture includes two fields, each of which is constituted by the right line images obtained by interlaced scanning.

3. An apparatus for encoding a signal with a three dimensional image sequence using left and right video image sequences, each of the left video images being a left picture, each of the right video images being a right picture, said apparatus comprising:

a mixer for merging each of said right pictures with a left picture continuously to produce a plurality of merged pictures, each merged picture containing a right field corresponding to a right picture and a left field corresponding to a left picture;

an encoder for encoding a first merged picture, selected from said plurality of merged pictures, to produce an I-picture, for predictively encoding a second merged picture, selected from said plurality of merged pictures, by using the aright and left fields of said first merged picture to produce a P-picture, and for predictively encoding a third merged picture, selected from said plurality of merged pictures and located between said first merged picture and said second merged picture, by using the fields of at least one of said first and second merged pictures to produbce a B-picture, wherein said encoder includes:

a macroblock converter for separating left and right fields of a merged picture into a plurality of left and right 16×16 pixel macroblocks, respectively;

a first value calculating circuit for calculating a first value indicative of the predictive encoding efficiency performed on each of said left and right 16×16 macroblocks, by using a target 16×16 left or right macroblock and one or more same left or right fields of said first and second merged pictures;

a second value calculating circuit for calculating a first value indicative of the predictive encoding efficiency performed on each of said left and right 16×16 macroblocks, by using a target 16×16 left or right macroblock and one or more opposite left or right fields of said first and second merged pictures;

a separator for separating each of said left 16×16 pixel macroblocks into a left upper and a left lower 16×8 macroblock, and separating each of said right 16×16 pixel macroblocks into a right upper and a right lower 16×8 macroblock;

a third value calculating circuit for calculating a second value indicative of the predictive encoding efficiency performed on each of said left and right 16×16 macroblocks by using a target 16×8 left or right macroblock and one or more same left or right fields of said first and second merged pictures;

a fourth value calculating circuit for calculating a second value indicative of the predictive encoding efficiency performed on each of said left and right 16×16 macroblocks by using a target 16×8 left or right macroblock and one or more opposite left or right fields of said first and second merged pictures; and a value comparator for selecting the most efficient predictive encoding process between said first to fourth values, whereby said encoder predictively encodes a merged picture to produce the P-picture or B-picture, based on the most efficient of the predictive encoding processes.

4. The method according to claim 3, wherein said left picture includes two fields, each of which is constituted by the left image lines obtained by interlaced scanning, and wherein said right picture includes two fields, each of which is constituted by the right image lines obtained by interlaced scanning.

* * * * *